United States Patent [19]
Gafford et al.

[11] Patent Number: 5,758,109
[45] Date of Patent: May 26, 1998

[54] REPEATER/SWITCH FOR DISTRIBUTED ARBITRATION DIGITAL DATA BUSES

[75] Inventors: Thomas Austin Gafford, Redondo Beach; Botond Gabor Eröss, deceased, late of Palo Alto; James A. Morrer, co executor; Barbara L. Barrie, co executrix, both of San Rafael, all of Calif.

[73] Assignee: Thomas A. Gafford, Redondo Beach, Calif.

[21] Appl. No.: 923,996

[22] PCT Filed: Mar. 19, 1990

[86] PCT No.: PCT/US90/01468

§ 371 Date: Aug. 16, 1993

§ 102(e) Date: Aug. 16, 1993

[87] PCT Pub. No.: WO91/14989

PCT Pub. Date: Oct. 3, 1991

[51] Int. Cl.⁶ ..................... G06F 13/00
[52] U.S. Cl. ..................... 395/308; 395/309
[58] Field of Search ............... 395/325, 308, 395/309, 306, 299; 307/85.13, 85.6, 94.7

[56] References Cited

U.S. PATENT DOCUMENTS

| | | | |
|---|---|---|---|
| 4,296,469 | 10/1981 | Gunter et al. | 395/325 |
| 4,604,689 | 8/1986 | Burger | 364/200 |
| 4,716,525 | 12/1987 | Gilanyi et al. | 364/200 |
| 4,821,170 | 4/1989 | Bernick et al. | 364/200 |
| 4,864,291 | 9/1989 | Korpi | 340/825.5 |
| 5,239,632 | 8/1993 | Larner | 395/325 |
| 5,239,653 | 8/1993 | Cubero-Castan et al. | 395/325 |
| 5,274,783 | 12/1993 | House et al. | 395/325 |
| 5,367,647 | 11/1994 | Coulson et al. | 395/325 |

OTHER PUBLICATIONS

United States Statutory Invention Registration No. H696, Oct. 3, 1989 Willard S. Davidson.
"OEMs Scramble to Launch Diverse SCSI Devices," Barry W. Phillips, Electronic Design, May 26, 1988, pp. 29–34.
"Intelligent Host Adapter Directs I/O Traffic, Freeing Up Host Processor," Robert Snively, Electronic Design, Sep. 20, 1984, pp. 243–252.
"Ethernet Controller Adds Communications to SCSI Bus," Tomas Russ, Electronic Design, Sep. 8, 1988, pp. 91–96.

*Primary Examiner*—Gopal C. Ray
*Assistant Examiner*—Xuonk Chunk-Trans
*Attorney, Agent, or Firm*—Donald E. Schreiber

[57] ABSTRACT

The technical field of the invention generally concerns digital computers and, in particular, repeaters or switches (40) for distributed arbitration digital data buses (52, 54, 56, and 58) to which devices (62, 64, 66, 68, 72 and 74) connect in parallel. The bus repeater/switch (40) includes a plurality of bus interface cards (48) that are connected to the distributed arbitration buses (52, 54, 56 and 58) for receiving signals from and transmitting signals to devices (62, 64, 66, 68, 72 and 74) connected thereto. The bus interface cards (48) connect to a control card (44) which allows signals from one of the sharing buses (52, 54 or 56) to be exchanged with the shared bus (58). The bus switch (40) also includes selector switch (84 or 88) for choosing which particular one of the sharing buses (52, 54 or 56) exchanges digital data signals with the shared bus (58). The bus switch (40) responds to signals on the distributed arbitration buses (52, 54, 56 and 58) and to phases of the protocol for those signals so that its presence between pairs of buses (52–58, 54–58 or 56–58) is imperceptible to devices (62, 64, 66, 68, 72 and 74) connected thereto.

14 Claims, 8 Drawing Sheets

5,758,109

1

REPEATER/SWITCH FOR DISTRIBUTED ARBITRATION DIGITAL DATA BUSES

TECHNICAL FIELD

The present invention relates generally to the technical field of digital computers and, more particularly, to electronic devices for switching among fully bidirectional digital data buses interconnecting digital computing devices.

BACKGROUND ART

Data buses are used throughout digital computer systems for communicating signals from one portion of the system to another. Digital data buses are used within microprocessor chips to communicate signals between different functional elements included in central processing units ("CPUs") of microprocessors or microcomputers, in floating point coprocessor chips, in memory management unit chips, etc. Within a digital computer but outside such integrated circuit chips, digital data buses communicate signals among those chips and between them and other assemblies included within the computer such as Random Access Memories ("RAM"), Read Only Memories ("ROM") and/or peripheral device input/output circuits. External to the computer, digital data buses communicate signals between it and peripheral devices such as keyboards, display devices, printers, modems, disk drives of various different types and/or tape drives.

Because of the widespread use of digital data buses throughout digital computer systems, myriad different types of buses have been developed over the years together with extremely sophisticated protocols governing the signaling process by which data is transferred over the bus between two devices such as between a digital computer and a peripheral device, e.g. a disk drive or a tape drive. For example, digital data buses and protocols have been developed in which one device, e.g. the digital computer or a portion of the digital computer identified variously by the terms channel or controller, is permanently assigned control of the data bus for transfers of data both to and from the peripheral device. For this type of bus, frequently the device that controls the bus is referred to as the bus master and the other devices connected to the bus are referred to as slaves. Other digital data buses and protocols have been developed in which a bus arbitration circuit separate from all peripheral devices assigns control of the data bus to one or the other of two intercommunicating devices, e.g. either the digital computer or the peripheral device. This type of bus protocol is often called multi-master with centralized arbitration.

A widely used digital data bus having a sophisticated protocol for exchanging data between devices is defined by the American National Standards Institute ("ANSI") X3.131-1986 standard which is incorporated herein by reference. This ANSI standard digital data bus is known colloquially as the Small Computer System Interface ("SCSI") bus. The SCSI bus differs from most prior data buses in several ways. First, devices connect to the SCSI bus in such a way that none of the signal lines in the bus pass through any circuitry in any devices. Rather, each device applies its signals to each of the SCSI bus signal lines. The other devices then receive those signals via the bus. Second, the SCSI bus permits distributed arbitration in which all the devices that arbitrate for the bus at a particular time resolve among themselves which of them will receive control of the bus. This contrasts with the multi-master bus with centralized arbitration.

As defined by the ANSI standard, the SCSI bus includes a DATA BUS having eight bidirectional data signal lines and an optional bidirectional data parity signal line, a termination power line, ground lines, and a set of nine (9) control signal lines, some of which are bidirectional. The 9 control signal lines of the SCSI bus are a Busy ("BSY") signal line, a Select ("SEL") signal line, a Control/Data ("C/D") signal line, an Input/Output ("I/O") signal line, a Message ("MSG") signal line, a Request ("REQ") signal line, an Acknowledge ("ACK") signal line, an Attention ("ATN") signal line, and a Reset ("RST") signal line. Examples of the signals that may be transmitted over these various signal lines are illustrated in FIG. 1.

In designing devices to be interconnected by a SCSI bus, one of two mutually incompatible conventions may be selected for the electrical signals present on the bus. These two alternative electrical conventions are respectively identified as "single-ended," which has a maximum total cable length of 6 meters, and "differential," which has a maximum total cable length of 25 meters. Devices having a single-ended SCSI bus interface circuit and those having a differential SCSI bus interface circuit cannot be simultaneously connected to the same SCSI bus. Accordingly, all devices connected to a particular SCSI bus must be either single-ended or differential. The signal protocol for transferring signals over a SCSI bus remains the same regardless of which of these two, mutually exclusive electrical conventions is chosen to implement the bus.

In accordance with the ANSI SCSI bus standard for the single-ended convention, the control, data and parity signal lines in the buses are true or asserted when in their low voltage state and are false or negated when in their high voltage state. For the differential convention, assertion is the condition in which the voltage on a "−" signal line is lower than that on the associated "+" signal line. Negation reverses this relationship with the voltage on the "−" signal line becoming higher than that on the "+" signal line. In the description that follows, when a device is said to "assert" ("negate") name(s) of signal line(s), this means the device asserts (negates) the signal(s) it applies to that line (those lines) in the SCSI bus.

In both of these conventions, two termination resistor networks, positioned at opposite ends of the bus and connected to all the SCSI bus signal lines, bias them to their unasserted state when no signal is present on the line. Consequently, all the signal lines respectively remain in their unasserted state unless a device connected to the SCSI bus asserts one or more of them. Furthermore, the BSY and RST signal lines of the SCSI bus, which are "wire-OR" signal lines, may be driven simultaneously by more than one device connected to the bus. Thus, for the BSY and RST signal lines, negation by a device does not mean that the BSY or RST line is actually negated. Rather negation by a device means merely that the device ceases to assert the signal it applies to the BSY or RST line.

Each device connected to a SCSI bus is assigned a unique address on the bus. A device's address on the SCSI bus corresponds to one of the bus' eight DATA BUS signal lines. Thus, a maximum of eight devices, each device being assigned one of the device addresses 0 through 7, may be connected to a SCSI bus with the address of each such device corresponding to one of the eight DATA BUS' signal lines. In the description which follows, when a device is said to assert an address on the SCSI bus, this means that it asserts the signal on the DATA BUS line corresponding to that address.

When two SCSI devices communicate over the bus, one device acts an initiator of the exchange and the other acts as its target device. An initiating device sends commands to a target and the target device performs them. Particular devices, e.g. a digital computer, a disk drive, a tape drive, etc., usually have fixed roles as either an initiator or as a target. However, in accordance with the SCSI standard, under certain circumstances some devices may be able to selectively operate either as an initiator or as a target. Furthermore, an initiator and a target may, by mutual agreement, execute a command by having the target release the bus following receipt of the command but before completing it. Under such circumstances, the target subsequently arbitrates for the bus and then reselects the initiator to complete execution of the command.

Certain SCSI bus functions are assigned to the initiator and certain are assigned to the target. An initiator may contend for control of the SCSI bus and upon acquiring control select a particular target, or conversely. After selection or reselection has occurred, the target always controls the exchange of data from the initiator. A target may request the transfer from the initiator of COMMAND, DATA, STATUS or other information over the DATA BUS lines.

Information transfers over the data lines of the SCSI bus are interlocked and follow a defined REQ/ACK handshake protocol. One byte of information may be transferred with each REQ/ACK handshake. There are two modes of interlocking that may be selected. In an "asynchronous" mode, the transfer of each byte of data must be acknowledged before the next byte may be transferred. In a "synchronous" mode, up to eight bytes of data may be transferred before an acknowledgement must occur.

Under the signaling protocol for communicating over the SCSI bus, there are eight distinct phases: a BUS FREE phase, an ARBITRATION phase, a SELECTION phase, a RESELECTION phase, and four different information exchange phases, i.e. a COMMAND phase, a DATA phase, a STATUS phase, and a MESSAGE phase. Under the ANSI standard, some of the protocols for these 4 information exchange phases may operate in various different ways depending upon the options that have been chosen from the SCSI standard in designing the two communicating devices.

FIG. 1 depicts the signals present on the nine control signal lines and the DATA BUS signal lines in the SCSI bus. As illustrated in FIG. 1, the BUS FREE phase of SCSI bus operation, depicted to the left of dashed line 20 and to the right of dashed line 22, occurs when no device asserts either SEL or BSY. Once the BUS FREE phase of the SCSI protocol occurs, under the ANSI standard any device connected to the bus may commence activity on the bus by moving from the BUS FREE phase to the ARBITRATION phase, depicted between dashed line 20 and dashed line 24.

As illustrated between the dashed lines 20 and 24 in FIG. 1, the ARBITRATION phase of the SCSI protocol begins when one or more devices arbitrate for the bus by simultaneously asserting BSY and its address on the SCSI bus. The address asserted by each device during the ARBITRATION phase indicates that device's priority to all other devices on the bus. If a device's address on the DATA BUS corresponds to data bit 7, then that device has the highest priority on the SCSI bus. Conversely, if a device's address on the SCSI bus corresponds to data bit 0, then that device has the lowest priority on the SCSI bus.

During the ARBITRATION phase depicted between dashed lines 20 and 24, each arbitrating device checks the other DATA BUS lines to determine if any higher priority device, i.e. a device that has a higher bus address, is also concurrently arbitrating for the bus. If an arbitrating device detects that a higher priority device is also arbitrating, it then ceases participating in the arbitration by negating its BSY and address signals. If a device ceases to arbitrate, it will not again attempt to arbitrate until the bus returns to its BUS FREE phase. Conversely, if an arbitrating device detects that its address on the DATA BUS-provides it with the highest priority among the arbitrating devices, i.e. the device won the arbitration, it then completes the ARBITRATION phase by asserting SEL followed by the address of the device with which it wishes to communicate.

The SELECTION phase of the SCSI bus protocol, depicted between dashed line 24 and dashed line 26 in FIG. 1, follows immediately after an ARBITRATION phase. In the SELECTION phase, the winning device negates I/O, asserts both its and the target's addresses on the DATA BUS and then negates BSY which it has continuously asserted since the beginning of the ARBITRATION phase. Each device connected to the SCSI bus that is capable of being selected recognizes that the SELECTION phase is under way and checks its address line to determine if it is being selected. The selected device responds to selection by asserting BSY. Upon receiving the assertion of the BSY signal from the selected device, the winning arbitrating device ends the SELECTION phase by negating SEL and the addresses. At the end of the SELECTION phase, since the winning arbitrating device negated I/O during SELECTION it enters the information exchange phase(s) as the SCSI bus initiator.

Alternatively, the RESELECTION phase of the SCSI bus protocol may follow immediately after an ARBITRATION phase. The RESELECTION phase resembles the SELECTION phase except that the winning arbitrating device also asserts I/O along with the selected device's address. After the selected device asserts BSY, the winning arbitrating device reasserts BSY and then negates SEL and the addresses. After the winning arbitrating device negates SEL and the addresses, the selected device negates BSY leaving the winning arbitrating device alone asserting BSY. At the end of the RESELECTION phase, since the winning arbitrating device asserted I/O during RESELECTION it enters the information exchange phase(s) as the SCSI bus target.

Under the ANSI standard, the SCSI bus protocol need not include an ARBITRATION phase. The standard for the SCSI bus permits systems in which a sole initiating device connected to the bus moves directly from the BUS FREE phase to the SELECTION phase without ever entering the ARBITRATION phase. However, in the more sophisticated implementations of the SCSI bus allowed under the ANSI standard, devices move from the BUS FREE phase to the ARBITRATION phase before entering either the SELECTION or RESELECTION phase.

After the SELECTION phase of the SCSI bus protocol ends, the information exchange phases begin with the bus coming under the control of the target device. In the example depicted in FIG. 1, the target device initiates a COMMAND phase between dashed line 26 and dashed line 28. This COMMAND phase is followed by a DATA phase with the data being transferred from the target to the initiator between dashed line 28 and dashed line 32 in FIG. 1. The DATA phase may be followed by a STATUS phase as illustrated in FIG. 1 between dashed line 32 and dashed line 34. Finally, the STATUS phase may be followed by a MESSAGE phase with the message being transferred from the target to the initiator between dashed line 34 and dashed line 22. The SCSI standard does not established any order or number of phases associated with an information exchange. Accordingly, as many COMMAND, DATA, STATUS and/or MESSAGE phases may occur as are needed to perform the desired operation. When the target device completes the desired operation and is finished with the bus, it ends the information exchange phases by negating the signal that it is applying to the BSY signal line as illustrated at dashed line 22 in FIG. 1. Negation of the signal on the BSY signal line by the target device returns the bus once again to the BUSS FREE phase.

For economic and other reasons, it frequently is desirable to share a peripheral device such as a tape drive or a disk drive among a number of computer systems without physically altering the cable connections to those systems, and without disturbing the operation of those systems. Accordingly, for many years various manufacturers have sold devices that allow a computer system operator to electronically switch a shared peripheral device from one computer system to another. Perhaps this practice of sharing a single peripheral device among several computer systems occurs most frequently in the instance of tape drives used for backing-up onto magnetic tape the data which is stored on disk drives.

While, conceptually, an electronic switch used to share a peripheral device among two or more computer systems does not seem very complicated, usually it is not so simple as a large, passive multi-pole mechanical switch that connects to the buses of each of the sharing computer systems and to the shared peripheral device. Such a large, passive multi-pole mechanical switch is usually incompatible with the electrical characteristics of high data transfer rate buses that connect peripheral devices to a computer system. This electrical incompatibility occurs because of the simultaneous presence of high frequency signals on all of the signal lines in the buses connected to the switch and because of the isolation required between the signals on all those buses. Even in its simplest form, an electronic switch for selectively connecting a single peripheral device such as a tape drive or a disk drive to one of the buses of several computer systems is an active electronic device that provides proper electrical termination for signal lines in the several buses while isolating all the signal lines in those buses from each other except for the signal lines in the pair of buses between which signals are to be exchanged.

Thus far, bus switches for arbitration type buses exist only for multi-master centralized arbitration buses. In such central arbitration, requests for access to the bus come to a single arbitration circuit. These requests to the arbitration circuit may be presented on several different bus request signal lines that respectively correspond to different priority levels for the requesting devices. Multiple devices may be connected to the same wire-OR bus request signal line. When such bus request signals arrive at the central arbitration circuit, it decides when and to which priority level it will grant control of the bus. The result of the arbitration circuit's decision is then transmitted back to the devices via bus grant signal lines included in the bus. In these central arbitration buses, the bus grant signal lines are often daisy-chained through the devices connected to the bus so the first requesting device at a particular priority level can block retransmission of the grant signal to devices further along the bus from the central arbitration circuit, and thereby take control of the bus. This daisy-chaining and grant blocking, if present, is sometimes described a positional priority system.

With these central arbitration buses, since the bus request signals flow to the central arbitration circuit and the bus grant signals flow from that circuit, it is relatively straight forward to build a bus switch that passes them between one of several sharing buses and the shared bus. By sensing whether the bus request signal and the bus grant signal pass through the switch, it can determine the proper direction to drive the bus control lines. Moreover, by sensing which of the two interconnected buses produces the data strobe signal and whether a read or write is occurring, the bus switch can decide in which direction to drive the data lines.

Conversely, in a distributed arbitration digital data bus such as the SCSI bus, there is no central arbitration circuit. Instead, all devices are connected to the SCSI bus in parallel. Accordingly, there are no unidirectional request and grant lines from which the bus switch can sense the direction of signal transmission. Instead, the digital computing devices simultaneously contending for access to the SCSI bus decide among themselves which one is to receive access. The winning device of this arbitration then selects the device with which it will exchange data. Thus, a bus switch for the SCSI bus must appear to pass all of the bus signals freely in both directions as though it were a continuous cable while secretly determining the direction in which signals are truly passing. Furthermore, the bus switch's circuits must perform this bidirectional signal transfer imperceptibly and without introducing electrical disturbances (glitches) on the signal lines. Only with this type of signal transmission will devices on both sides of the bus switch that are competing for access to the bus be unaffected by the switch's presence between them. If the electronic circuits included in the switch are incapable of operating in this manner, signaling errors may occur.

For some interval of time, a firm named Rancho Technology has offered a SCSI bus repeater that interfaces between a single-ended SCSI bus and a differential SCSI bus. For each of the eighteen signal lines in a single-ended SCSI bus (or equivalently, for each of the eighteen pairs of signal lines in a differential SCSI bus), the Rancho Technology repeater appears to include a pair of two input NOR gates having resistors that respectively cross-couple the output signal from each of the NOR gates to an input of the other NOR gate. For each of the eighteen pairs of NOR gates, this device also appears to include capacitors connected between circuit ground and the junction between the resistors and the input of each NOR gate. In addition to the resistors and capacitors connected to one input of the NOR gates, the second input of one NOR gate in each of the eighteen pairs appears to receive the signal on one of the single-ended SCSI bus's data lines via a single-ended receiving buffer. The second input of the other NOR gate in each of the eighteen pairs appears to receive a single-ended output signal from a receiving buffer for the corresponding differential SCSI bus signal. The output signal from the NOR gate that receives the single-ended SCSI bus' signal appears to be connected to the control input of a transmitting buffer for the differential SCSI bus. The two outputs from this transmitting buffer appear to be connected in parallel to the inputs of the buffer that receives the differential SCSI bus signal. The input signal to this transmitting buffer for the differential SCSI bus appears to be the single ended SCSI bus signal that is applied to the NOR gate whose output signal appears to control the buffer's operation. The output signal from the other NOR gate that receives one of its input signals from the differential SCSI bus is applied through a NAND gate to the single-ended SCSI bus signal line and thereby is also applied to the input of the single-ended bus' receiving buffer.

The NOR gates in the circuit described above for the Rancho Technology single-ended SCSI bus to differential SCSI bus repeater appear to operate as an arbitration-latch that gives control of each of the SCSI bus' eighteen signal lines to the individual line in each bus which first asserts the signal on that line. If the circuit operates in this way, then the combined resistors and capacitors connected to the inputs of the eighteen pairs of NOR gates appear to delay latching of the cross-coupled NOR gates for a brief interval after assertion of that signal on either the single-ended or differential SCSI bus. However, the circuit for each of the eighteen SCSI bus signal lines in the Rancho Technology repeater appears to be asymmetric by its inclusion of a diode connected in parallel with one of the cross-coupling resistors. This diode has its anode connected to the output of the NOR gate that receives the single-ended SCSI bus' signal and its cathode connected to the junction of the resistor and capacitor connected to the input of the NOR gate which receives the signal from the differential SCSI bus. If the arbitration-latch in the Rancho Technology repeater operates as described above, then this diode biases the arbitration-latch's operation to provide faster response to assertion of a SCSI bus signal, on, the single-ended bus than assertion of that same signal on the differential bus.

Reports regarding the operation of the Rancho Technology SCSI bus repeater indicate, that its eighteen relatively simple circuits, all of which operate independently of each other (e.g. there is no coupling of signal state on the SCSI bus' BSY signal line to its SEL, DB0–DB7, or DBP signal lines), does not operate reliably under all circumstances. It appears that for some SCSI bus applications the Rancho Technology single-ended to differential SCSI bus repeater operates satisfactorily and for other applications it operates unsatisfactorily. It appears reasonable to infer that the inconsistent operation of the Rancho Technology SCSI bus repeater is in some unknown way due to the simpleness of its circuit when that circuit is required to respond to signals from SCSI bus devices that employ sophisticated features of the SCSI bus protocol, e.g. reselection. It further appears that this repeater may have been designed to operate properly in SCSI systems in which arbitrating devices connect only to the single-ended bus.

Disclosure of Invention

An object of the present invention is to provide a repeater/switch for interconnecting two of two or more distributed arbitration digital data buses.

Another object of the present invention is to provide a repeater/switch for interconnecting two of two or more bidirectional digital data buses having signal lines that may, at some instant in time, be either driven or received by any device on the bus.

Another object of the present invention is to provide a repeater/switch for interconnecting two of two or more bidirectional digital data buses in which no signal present on the buses can be relied upon to always be driven in a particular direction through any point on the bus between any two devices.

Another object of the present invention is to provide a repeater/switch for interconnecting two of two or more bidirectional digital data buses in which the signal present on no signal line may be relied upon to determine whether another signal line in the bus is being driven or not by a particular device on the bus.

Another object of the present invention is to provide a switch for sharing a device among one of several distributed arbitration digital data buses, such as those operating in accordance with the SCSI standard, without physically disconnecting the conductors over which those buses transmit their respective signals.

Another object of the present invention is to provide a bus repeating/switching device that is easily and economically adapted to alternative electrical standards for signal transmission over one or more of several buses.

Another object of the present invention is to provide a bus repeating/switching device that facilitates requesting access to a shared bus.

Another object of the present invention is to provide a bus repeater/switch that indicates when devices having both single-ended and differential bus interface circuits are simultaneously connected to the same SCSI bus.

Yet another object of the present invention is to provide a bus repeater/switch that is cost effective, simple to manufacture, easy to maintain, and economical to manufacture.

Briefly, the present invention is a bus repeater/switch for electronically exchanging digital control and data signals between a selected one of several sharing distributed arbitration buses and a shared distributed arbitration bus. In the embodiment of the invention disclosed herein, the distributed arbitration buses conform to the ANSI standard for the SCSI bus. The repeater/bus switch includes a plurality of bus interface cards, equal in number to the number of buses, that connect to the distributed arbitration buses for receiving signals from and transmitting signals to devices connected thereto. The bus interface cards connect to a control card that allows signals from one of the sharing buses to be exchanged with the shared bus via the control card and the interface cards respectively connected to the selected sharing bus and to the shared bus. The bus switch also includes a selector switch for choosing which particular one of the sharing buses exchanges digital data signals with the shared bus. In the preferred embodiment, the selector switch means includes a plurality of switches equal in number to the plurality of the sharing bus interface cards. Each of these switches is associated with a sharing bus interface card and with the sharing bus connected thereto. Activation of a switch generates a selection signal that requests exchanging of control and data signals between the shared bus and the sharing bus with which the switch is associated.

The repeater or bus switch responds to signals on the distributed arbitration buses and to phases of the protocol for those signals so that its presence between pairs of buses is imperceptible to devices connected thereto. In the particular embodiment disclosed herein, the repeater/bus switch responds to the ARBITRATION and SELECTION phases of the SCSI bus protocol to prevent the creation of glitches in the signals that it applies to the buses and to prevent the propagation of glitches between interconnected pairs of buses.

These and other features, objects and advantages will be understood or apparent to those of ordinary skill in the art from the following detailed description of the preferred embodiment as illustrated in the various drawing figures.

BRIEF DESCRIPTION OF DRAWINGS

FIG. 4 assembled by combining

FIG. 6, assembled by combining

BEST MODE FOR CARRYING OUT THE INVENTION

Figure 2:
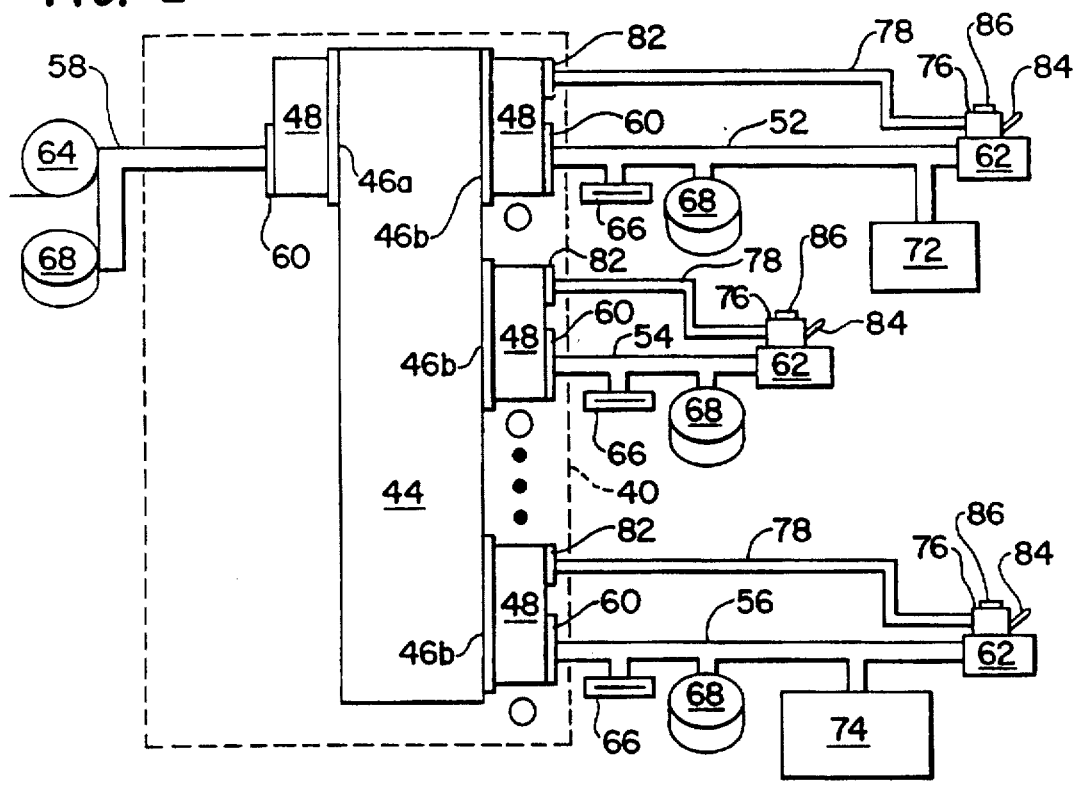
FIG. 2 is a block diagram depicting digital data buses interconnecting a network of computing devices, including a bus switch in accordance with the preferred embodiment of the invention having a control card and a plurality of interface cards.

FIG. 2 depicts a network of computing devices including a bus switch 40 in accordance with the present invention enclosed within a dashed line. The bus switch 40 includes a printed circuit control card 44 having a single shared bus interface connector 46a and a plurality of sharing bus interface connectors 46b that respectively receive and electrically connect to printed circuit interface cards 48. In addition to electrically connecting to the control card 44 through the interface connectors 46a or 46b, each of the interface cards 48 is also electrically connected to one of several sharing data buses 52, 54 or 56, or to a shared data bus 58 through a SCSI bus connector 60. Also connected to the data buses 52, 54, 56 or 58, in addition to the bus switch 40, are other devices such as digital computers 62, a tape drive 64, and various different types of disk drives such as floppy disk drives 66, hard disk drives 68, a Compact Disk Read Only Memory ("CD ROM") drive 72, and a Write Once Read Many ("WORM") drive 74.

Figure 1:
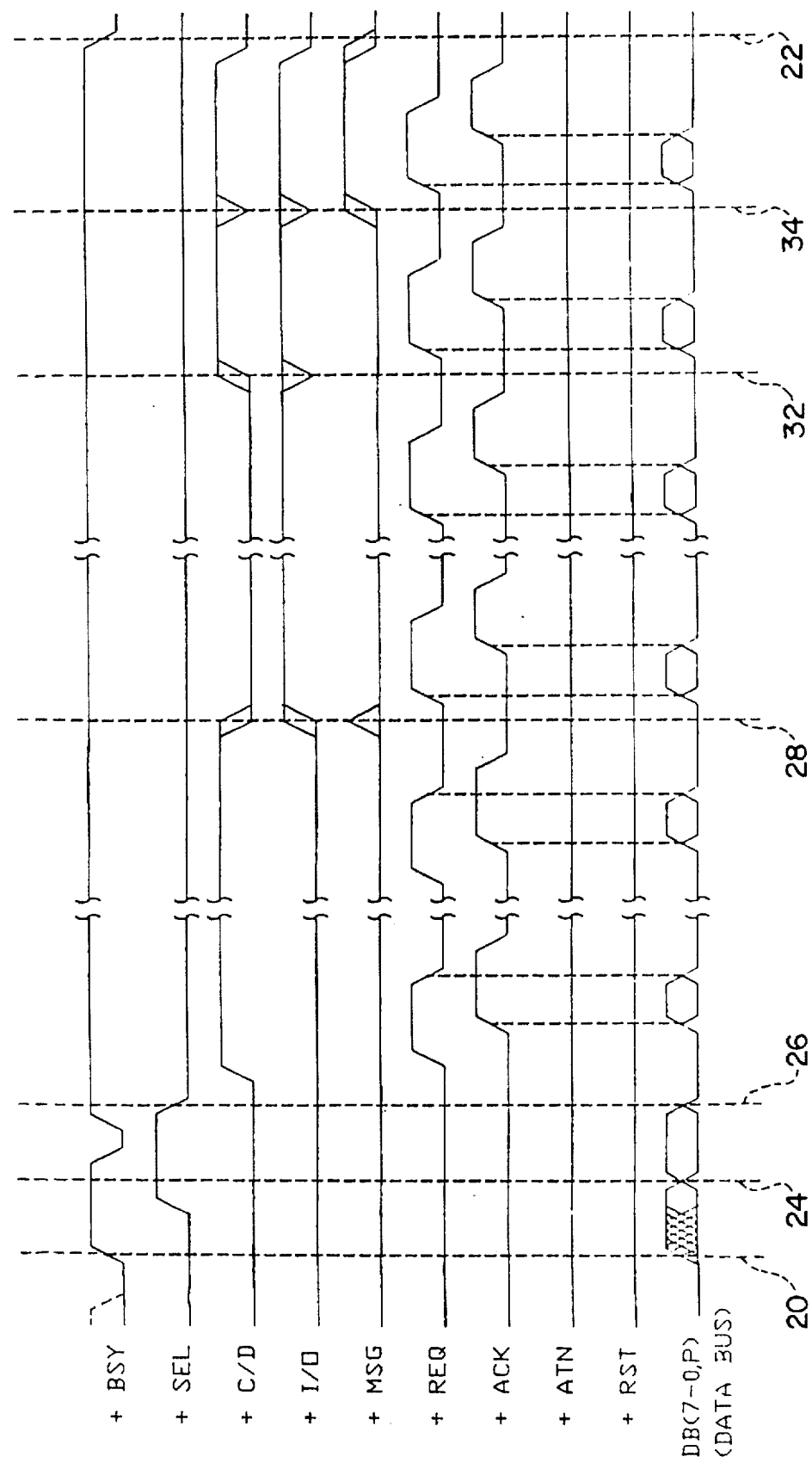
FIG. 1 is a pulse timing diagram depicting signals present on the various lines of the SCSI bus during a sequence of phases in the bus' operation.

In the preferred embodiment of the present invention, all the data buses 52, 54, 56 and 58 conform to the ANSI standard for the SCSI bus. While only three sharing buses 52, 54, and 56 are illustrated in FIG. 1, in principle there is no limit on the number of interface cards 48 that may be included in the bus switch 40. Accordingly, the bus switch 40 may be constructed to allow selectively connecting the shared data bus 58 with any one of an unlimited number of sharing data buses including the sharing data buses 52, 54 and 56 such as are depicted in FIG. 2.

In accordance with the SCSI bus standard only single-ended or only differential SCSI bus devices may be connected to each of the data buses 52, 54, 56 and 58. However, as will be explained in greater detail below, all of the data buses 52, 54, 56 and 58 need not be exclusively single-ended or exclusively differential. For example, all of the devices connected to the sharing data buses 52 and 56 might be single-ended while all of the devices connected to the sharing data bus 54 and the shared data bus 58 might be differential. Thus, in addition to providing a switch for the SCSI bus, the bus switch 40 may also function as an adapter that allows data to be exchanged between single-ended and differential SCSI buses.

In the preferred embodiment, included in the bus switch 40 and associated with each of the computers 62 is a shared bus-request box 76. Each shared bus-request box 76 connects through a shared bus-request cable 78 and a shared bus-request connector 82 to one of the interface cards 48. Each of the shared bus-request cables 78 is associated with one of the sharing data buses 52, 54 or 56 and each of the shared bus-request boxes 76, which preferably is mechanically secured to the computer 62 by a piece of Velcro®, is also associated with that same sharing data bus 52, 54 or 56. Each of the shared bus-request boxes 76 includes a toggle switch 84 and a Light Emitting Diode ("LED") 86.

By closing the contacts of the toggle switch 84 in the shared bus-request box 76 attached to a particular computer 62, an operator of the computer 62 transmits a signal to the interface card 48 to which the toggle switch 84 is connected by the shared bus-request cable 78 requesting that the bus switch 40 connect the shared data bus 58 with the particular sharing data bus 52, 54 or 56 with which the toggle switch 84 is associated. To free the shared data bus 58 for connection with other sharing data buses 52, 54 or 56, the operator opens the contacts of the toggle switch 84 thereby terminating the request signal.

After closure of the contacts of one of the toggle switches 84 requests connection of one of the sharing data buses 52, 54 or 56 with the shared data bus 58, and the shared data bus 58 and the sharing data bus 52, 54 or 56 both enter the BUS FREE phase of SCSI-bus-protocol, and all other toggle switches 84 are open, the bus switch 40 connects the shared data bus 58 with the sharing data bus 52, 54 or 56 associated with the toggle switch 84 having closed contacts. Upon connecting the shared data bus 58 with one of the sharing data buses 52, 54, or 56, the bus switch 40 provides a visual indication that the connection has been formed by illuminating the LED 86 in the shared bus-request box 76 secured to the particular computer 62 for which interconnection has been requested.

As controlled by the closing of contacts on the various toggle switches 84 and by operating conditions on the data buses 52 through 58, at any instant in time the bus switch 40 may exchange signals between the shared data bus 58 and one of the sharing buses 52, 54 or 56 while simultaneously isolating that pair of communicating buses from the remainder of the sharing data buses 52, 54 or 56. Thus, at any instant in time the bus switch 40 electrically interconnects the shared data bus 58 with any one of the sharing data buses 52, 54 or 56 to establish composite buses 52–58, 54–58 or 56–58 and exchanges control and data signals back and forth between the pair of buses that it interconnects to form the composite bus. Accordingly, at any instant in time only one of the LEDs 86 may be illuminated.

When the request for interconnection of the shared data bus 58 with one of the sharing data buses 52, 54 or 56 is terminated by opening the contacts of the toggle switch 84, the bus switch 40 indicates the severing of that connection by extinguishing the LED 86 at the computer 62. If, inadvertently, a request for interconnection of the shared data bus 28 with one of the sharing data buses 52, 54 or 56 is maintained when it is, in fact, no longer required, thereby preventing interconnection of the shared data bus 58 with other sharing data buses 52, 54 or 56, and it is physically impossible to open the contacts of the toggle switch 84, e.g. the shared bus-request box 76 is located in a locked office, the bus request signal may be terminated simply by unplugging the appropriate shared bus-request cable 78 from its connector 82.

Figure 3:
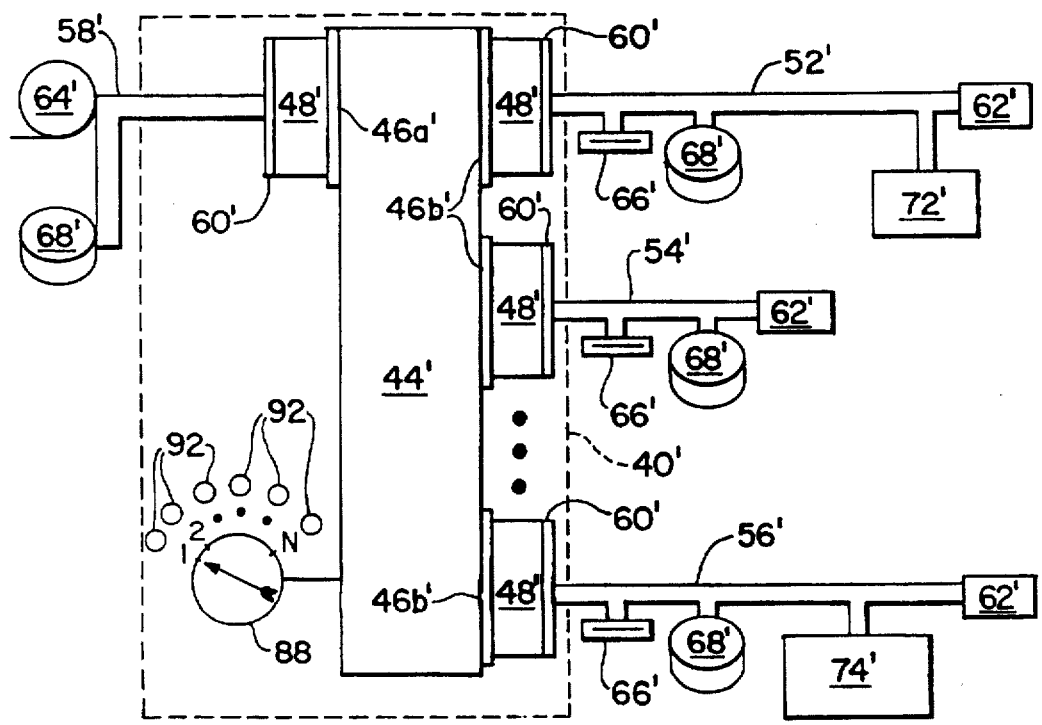
FIG. 3 is a block diagram depicting a network of computing devices, similar to that depicted in FIG. 2, that illustrates an alternative embodiment of the bus switch.

FIG. 3 depicts a network of computing devices substantially identical to that depicted in FIG. 2 that illustrates an alternative embodiment of the bus switch. Those elements depicted in FIG. 3 that are common to the network of computing devices or to the bus switch 40 depicted in FIG. 2 carry the same reference numeral distinguished by a prime ("'") designation. In FIG. 3, the shared bus-request boxes 76, together with their associated toggle switches 84 and LEDs 86, and the shared bus-request cable 78 and the shared bus-request connector 82 have been eliminated from the bus switch 40 depicted in FIG. 2. Providing the same function in FIG. 3 as the shared bus-request boxes 76, the toggle switches 84 and the LEDs 86 of FIG. 2 is a single multi-pole selector switch 88 that is physically enclosed within the same housing as the control card 44' and the interface cards 48'.

As controlled by the position of the selector switch 88, at any instant in time the bus switch 40' connects the shared data bus 58' to one of the sharing data buses 52', 54' or 56' while simultaneously isolating it from the remainder of the sharing data buses 52', 54' or 56', and also simultaneously isolating each of those other buses from each other. Thus, depending upon the position of the selector switch 88, at any instant in time the bus switch 40' electrically interconnects the shared data bus 58' with any one of the sharing data buses 52', 54' or 56' to establish composite buses 52'–58', 54'–58' or 56'–58' and exchanges control and data signals back and forth between the pair of buses which form the composite bus. In the bus switch depicted in FIG. 3, the connection of the shared data bus 58' to a particular sharing data bus 52', 54', or 56' is indicated by illuminating the appropriate one of a plurality of LED's 92 analogously to the illumination of one of the LED's 86 depicted in FIG. 2.

To illustrate the preferred embodiment of the invention while simultaneously describing in full generality the true nature and extent of the invention, as stated above, the following discussion proceeds upon the basis that the data buses 52, 54, 56 and 58 interconnecting the various devices 62, 64, 66, 68, 72 and 74 and the bus switch 40 operate in accordance with the ANSI standard for the SCSI bus. Accordingly, for purposes of the following discussion at no time may any more than eight devices be connected to any one of the composite buses 52–58, 54–58 or 56–58. Furthermore, each device connected to the composite buses 52–58, 54–58 and 56–58 must have a unique address on the respective composite buses 52–58, 54–58 and 56–58 to which they are connected regardless of the configuration of the buses established by the operation of the bus switch 40.

Interface Card 48

Figure 4A:
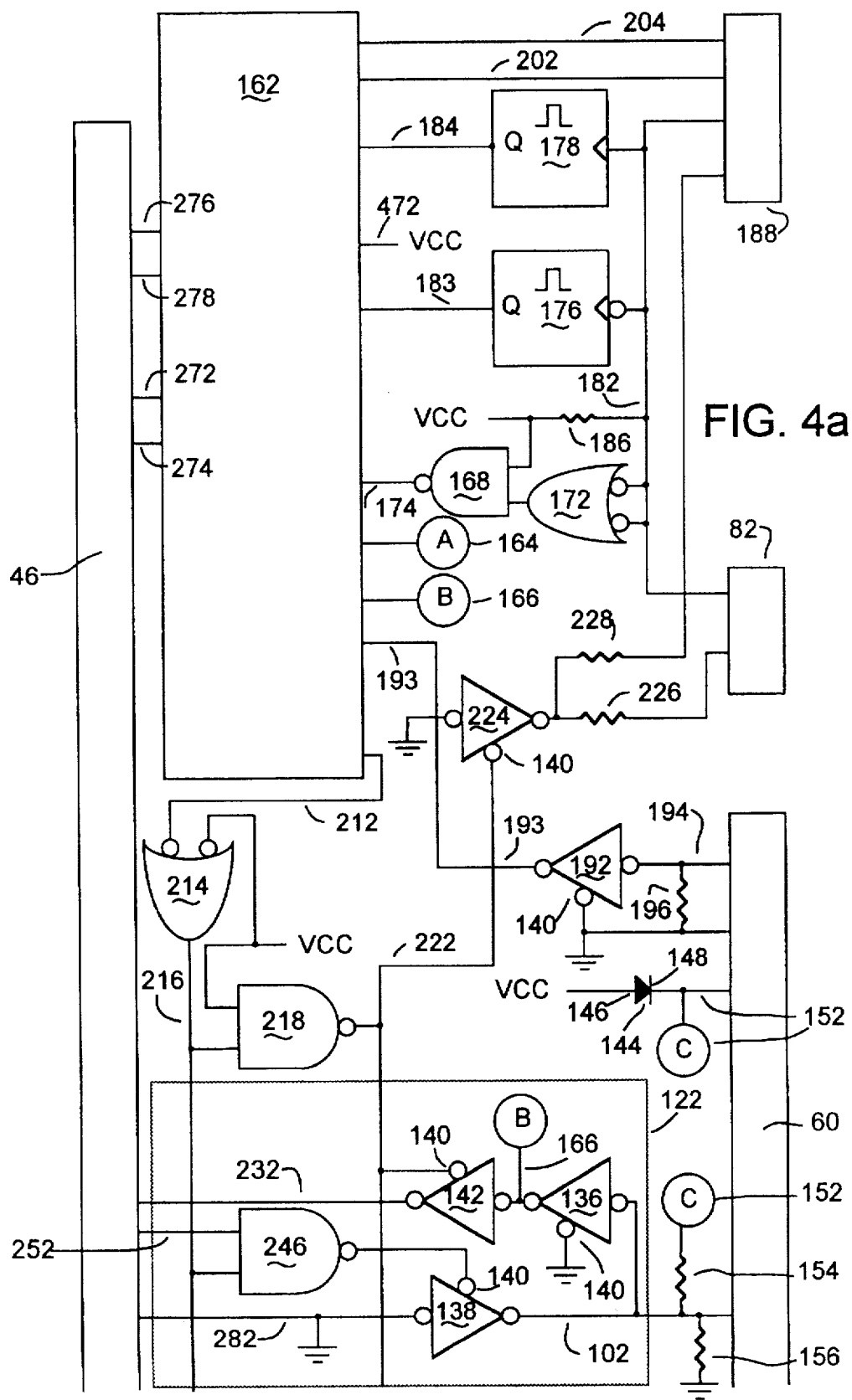
FIGS. 4a and 4b, is a block/logic diagram depicting a single-ended interface card for the bus switch of FIGS. 2 and 3 including the interface card's Programmable Array Logic ("PAL")
Figure 4B:
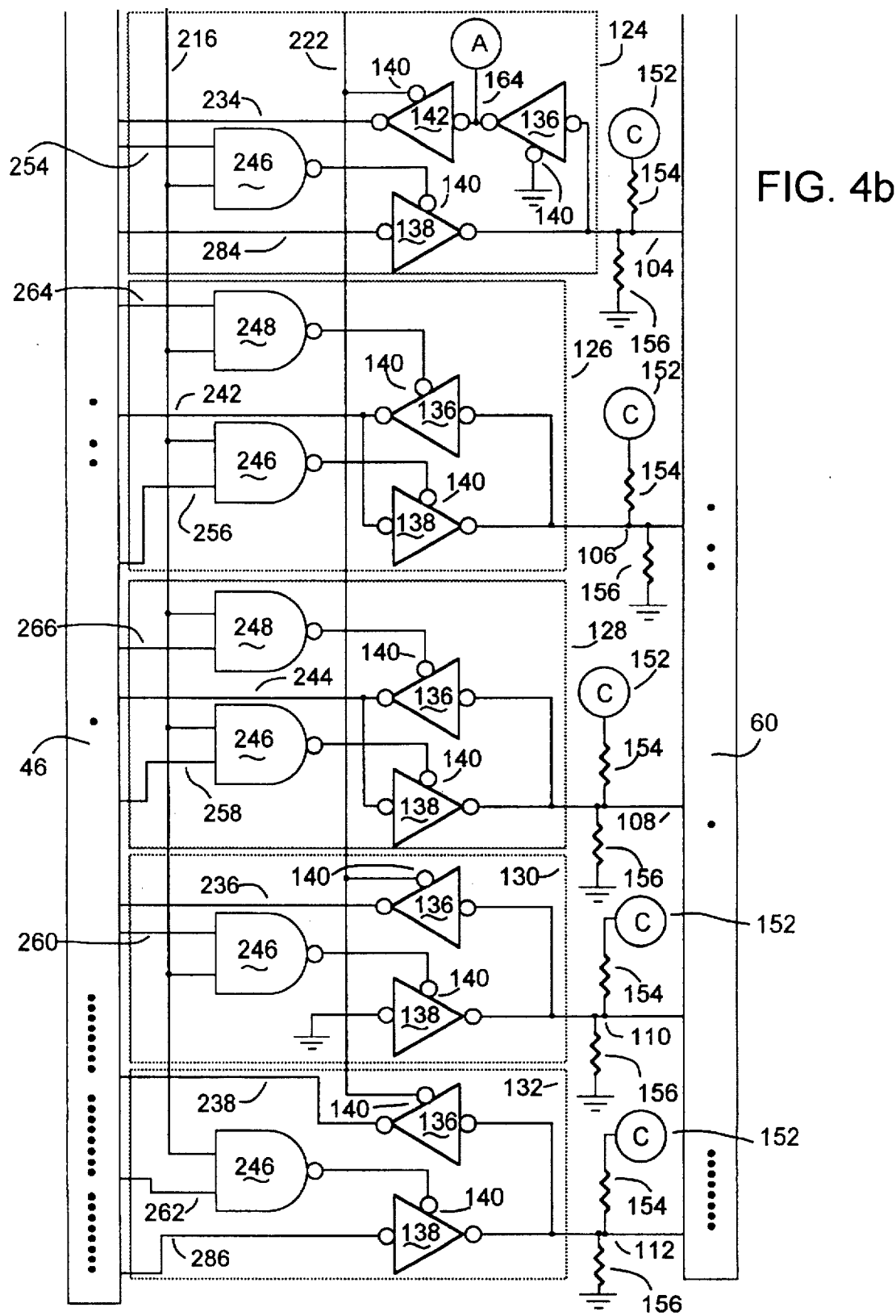

FIG. 4, made up of FIG. 4a and 4b, schematically depicts the digital logic circuits included in a single-ended interface card 48. Interface cards of this type depicted in FIG. 4 may be connected to the control card 44 at any of its interface connectors 46a or 46b to exchange signals between the control card 44 and any of the sharing data buses 52, 54 or 56, or with the shared data bus 58.

The signals present at the SCSI bus connector 60 depicted in FIG. 4 includes a BSY control signal line 102, a SEL control signal line 104, C/D, I/O, MSG and REQ control signal lines 106 (only one of which is depicted in FIG. 4b with the additional lines indicated only by dots within the SCSI bus connector 60 immediately above and below the line 106), ACK and ATN control signal lines 108 (only one of which is depicted in FIG. 4b with the additional lines indicated only by a dot within the SCSI bus connector 60 immediately below the line 108), a RST control signal line 110, and the eight DB0–DB7 data signal lines and one DBP parity signal line 112 (only one of which is depicted in FIG. 4 with the additional lines indicated only by dots within the SCSI bus connector 60 immediately above the line 112). The eight data signal lines 112, DB0–DB7, and the parity signal line 112, DBP, constitute the DATA BUS portion of the SCSI bus.

The single-ended interface card 48 depicted in FIG. 4 includes a switched transceiver circuit 122 for the BSY signal line 102, a switched transceiver circuit 124 for the SEL signal line 104, four switched transceiver circuits 126 (only one of which is illustrated in FIG. 4) respectively for the C/D, I/O, MSG and REQ signal lines 106, two switched transceiver circuits 128 (only one of which is illustrated in FIG. 4) respectively for the ACK and ATN signal lines 108, a switched transceiver circuit 130 for the RST signal line 110, and nine switched transceiver circuits 132 (only one of which is illustrated in FIG. 4) for the DATA BUS of the SCSI bus. Each of the switched transceiver circuits 122–132 is enclosed within a dashed line box in FIG. 4.

Though each of the switched transceiver circuits 122–132 is slightly different from all of the other switched transceiver circuits 122–132, all of the transceiver circuits 136–132 include a tri-state receiving buffer 136 and a tri-state transmitting buffer 138. The receiving buffer 136 and the transmitting buffer 138 of the switched transceiver circuits 122–132 may be 74LS125 integrated circuits. Each of the buffers 136 and 138 includes a control input 140 to which a logic low signal is applied if the signal present at the input of the buffers 136 and 138 is to appear at their respective outputs. Applying a logic high signal to the control input 140 of the buffers 136 and 138 causes their outputs to become open circuited.

Because the bus switch 40 must continuously monitor the respective states of the BSY signal line 102 and the SEL signal line 104 even when the switch 40 is not exchanging signals between the shared data bus 58 and one of the sharing data buses 52, 54, or 56 and in so monitoring the states of those signals must present only a single electrical load to the bus 52, 54, 56 or 58, the control input 140 of the receiving buffer 136 for both of the switched transceiver circuits 122 and 124 is connected to circuit ground. Grounding the control inputs 140 of the receiving buffers 136 in the BSY signal switched transceiver circuit 122 and the SEL signal switched transceiver circuit 124 causes the state of the signals on the BSY signal line 102 and the SEL signal line 104 to always be present at their respective outputs. Because an output signal is always present at the outputs of the receiving buffers 136, both the BSY signal switched transceiver circuit 122 and the SEL signal switched transceiver circuit 124 include a second tri-state intermediate buffer 142 that respectively receives those output signals. The intermediate buffers 142 may also be 74LS125 integrated circuits.

To provide a source of termination power in accordance with the ANSI standard for the SCSI bus, the interface card 48 includes a 1N4002 diode 144 having an anode 146 which is connected to Vcc and a cathode 148 which is connected to a TERMPWR line 152 included in the SCSI bus connector 60. If a particular interface card 48 connects at either end of the SCSI bus, then in accordance with the ANSI standard, for each of the signal lines in the SCSI bus, it must include pairs of series connected termination resistors 154 and 156. As illustrated in FIG. 4, one end of each pair of series connected termination resistors 154 and 156 is connected to the TERMPWR line 152, the other end is connected to circuit ground, and their junction is connected to the respective signal line 102–112. If the interface card 48 is connected between the ends of one of the SCSI buses 52–58 depicted in FIG. 1, then all of the resistors 154 and 156 are omitted from the interface card 48.

In addition to being applied as input signals to the intermediate buffers 142, the signals from the outputs of the receiving buffers 136 in the BSY and SEL switched transceiver circuits 122 and 124 are applied as input signals to an interface card logic Programmable Array Logic ("PAL") 162 respectively via a BSY BUF L signal line 164 and a SEL BUF L signal line 166. The interface card logic PAL 162 also receives an output signal from a series connected NAND gate 168 and NOR gate 172 via a SW DEL L signal line 174. The NAND gate 168 and NOR gate 172 operate as a non-inverting buffer to provide delay. An input signal is applied to both inputs of the NAND gate 172 and to inputs of monostable multivibrators 176 and 178 via a SWITCH L signal line 182. The monostable multivibrators 176 and 178 may be 74LS123 integrated circuits. The output signals from the monostable multivibrators 176 and 178 are applied as input signals to the interface card logic PAL 162 respectively via a SW ON TMR H signal line 183 and a SW OFF TMR H signal line 184. A resistor 186 connects the SWITCH L signal line 182 to Vcc which is also connected directly to one input of the NAND gate 168. The NAND gate 168, the NOR gate 172 and the two monostable multivibrators 176 and 178 permit the PAL logic to debounce the signal on the SWITCH L signal line 182.

In the preferred embodiment of the invention illustrated in FIG. 2, the signal present on the SWITCH L signal line 182 is the bus request signal from the toggle switch 84 located in one of the shared bus-request boxes 76. This bus request signal is received at the interface card 48 via the shared bus-request cable 78 and the shared bus-request socket 82. In the alternative embodiment of the invention illustrated in FIG. 3, the signal present on the SWITCH L signal line 182 comes from the selector switch 88 depicted in FIG. 3 and is received at the interface card 48 via an inter-interface card connector 188 included in the interface card 48.

The interface card logic PAL 162 also receives an output signal from a 74LS125 buffer 192 via a BUS OK L signal line 193. The buffer 192 receives its input signal from a DIFFSENS line 194 which for the single-ended interface card 48 depicted in FIG. 2 is connected to pin 25 of the SCSI bus connector 60. A resistor 196 connects the DIFFSENS line 194 to circuit ground to which the control input 140 of the buffer 192 is also connected. Accordingly, the signal present at the input of the buffer 192 is always applied as an input signal to the interface card logic PAL 162 via the BUS OK L signal line 193. The DIFFSENS line 194 and the buffer 192 provide the interface card logic 194 with a signal that indicates whether or not a device adapted for exchanging signals over the SCSI bus using the differential signal convention is connected to the single-ended interface card 48 by detecting whether a source of differential termination network power is present on a line that is unused on the single-ended SCSI bus. If the PAL 162 of the single-ended interface card 48 receives a signal indicating that it is connected to a differential type SCSI device, it immediately electronically isolates the circuits on the interface card 48 from the control card 44 and the bus 52, 54, 56 or 58 to which it connects.

A PRI IN L signal line 202 provides the interface card logic PAL 162 with a signal from the inter-interface card connector 188. A PRI OUT L signal line 204 transmits a signal from the interface card logic PAL 162 to the inter-interface card connector 188. Within the housing for the bus switch 40 but external to the interface card 48, the PRI IN L signal lines 202 and the PRI OUT L signal lines 204 are "daisy-chained" from the control card 44 through all of the interface cards 48 which connect to the sharing data buses 52, 54 and 56. The daisy-chained signal on the PRI IN L signal lines 202 and the PRI OUT L signal lines 204 permits the interface cards 48 to resolve contention for the shared data bus 58 among themselves. The SWITCH L signal line 182 and PRI IN L signal line 202 on the shared interface card 48 are wired to ground and thus the shared interface card 48 is enabled at all times.

The interface card logic PAL 162 also provides an output signal on a BOARD SELECT L signal line 212 to an input of a NOR gate 214. The other input of the NOR gate 214 is connected to Vcc and its output is connected via a BOARD ENB H signal line 216 to an input of a NAND gate 218. The other input of the NAND gate 218 is also connected to Vcc and its output is connected via a BOARD ENB L signal line 222 to a control input 140 of a 74LS125 buffer 224. The input to the buffer 224 is connected to circuit ground while its output signal is transmitted via resistors 226 and 228 respectively to the shared bus-request connector 82 and the inter-interface card connector 188. The output signal from the buffer 224 passes through the resistor 226 through the shared bus-request connector 82 and the shared bus-request cable 78 to the LED 86 included in the shared bus-request box 76. Analogously, in the preferred embodiment of the present invention the output signal from the buffer 224 passes through the resistor 228 through the inter-interface card connector 188 and a cable located within the housing of the bus switch 40 to an LED, such as one of the LEDs 92 illustrated in FIG. 3. This LED, which is not illustrated in FIG. 2, is preferably located on the housing for the bus switch 40 adjacent to the SCSI bus connector 60 and shared bus-request connector 82 to be visible from the outside of the housing. Thus, the LED connected to the resistor 228 of the interface card 48 provides a visual indication at the bus switch 40 of which of the sharing data buses 52–56 is enabled to exchange signals with the shared data bus 58.

A low signal present on the BOARD SEL L signal line 212 produces a high signal present on the BOARD ENB H signal line 216 and a low on the BOARD ENB L signal line 222 to enable the interface card 48 for exchanging signals between the shared data bus 52, 54 or 56 to which it is connected and the control card 44. Only one of the interface cards 48 connected to the shared data buses 52, 54 or 56 may be enabled at any time. Enabling an interface card 48 does not necessarily mean that data is actually being transferred from the sharing data bus 52, 54 or 56 to the shared data bus 58 via the enabled interface card 48. Rather it merely means that the bus switch 40 is enabled to respond to the signaling protocol on the SCSI bus for exchanging signals between the shared data bus 58 and the sharing data bus 52, 54 or 56 that is connected to the enabled interface card 48. Data exchanges between that particular sharing data bus 52, 54 or 56 and the shared data bus 58 occur only as part of a sequence of phases occurring on the SCSI bus such as those illustrated in FIG. 1. The fact that a particular sharing data bus 52, 54 or 56 is enabled for such data exchanges is indicated both at the housing for the bus switch 40 and in the preferred embodiment at the shared bus-request box 76 by illumination of their respective LEDs.

In addition to enabling the buffer 224 for illuminating the LEDs 86 and 92, the signal on the BOARD ENB L signal line 222 is also supplied to the control inputs 140 of the intermediate buffers 142 in the switched transceiver circuits 122 and 124 respectively for the BSY and SEL signals, and to the control inputs 140 of the receiving buffers 136 in the switched transceiver circuit 130 for the RST signal and nine switched transceiver circuits 132 for the DATA BUS portion of the SCSI bus. Thus, whenever the BOARD ENB L signal of the interface card 48 is asserted, the series connected buffers 136 and 142 in each of the switched transceiver circuits 122 and 124, and the buffers 136 in the switched transceiver circuit 130 and the nine switched transceiver circuits 132 respectively transmit the BSY, SEL, RST and DATA BUS signals from the SCSI bus connector 60 to the interface connector 46. Accordingly, when the BOARD ENB L signal is asserted, the signal on the BSY control signal line 102 of the SCSI bus is supplied to the control card 44 via a BSY IN L signal line 232. In a similar way, the control card 44 receives the signals present on the SEL control signal line 104 via a SEL IN L signal line 234, on the RST control signal line 110 via a RST IN L signal line 236, and on the eight data signal lines, DB0–DB7, and one parity signal line, DBP, 112 via nine DBn IN L signal lines 238. (Note that FIG. 4 depicts only one of the eight data signal lines 112 while dots in the connector 46 indicated the presence of the other 8 signal lines.) The BSY, SEL and DB0-DB7 and DBP signals are always supplied to the control card 44 when the interface card 44 is enabled because the bus switch 40 must respond to signals on those lines during the SCSI bus' arbitration phase. Analogously, the RST signal must also be supplied continuously to the control card 44 because a reset signal may occur at any time on the composite bus made up of the shared data bus 58 and one of the sharing data buses 52-56.

As described above, the signal present on the BOARD ENB L signal line 222 is applied directly to the control input 140 of the intermediate buffer 142 in the switched transceiver circuits 122 and 124 and to the receiving buffer 136 in the switched transceiver circuits 130 and 132. Conversely, the signal present on the BOARD ENB H signal line 216 is not applied directly to the control input 140 of any of the buffers 136 or 138. Rather, the signal on the BOARD ENB H signal line 216 is applied to the control inputs 140 of each of the transmitting buffers 138 in all of the switched transceiver circuits 122-132 through NAND gates 246. Similarly, the signal on the BOARD EN.B H signal line 216 is applied through NAND gates 248 to the control inputs 140 of the receiving buffers 136 in the switched transceiver circuits 126 and 128. Though not expressly so depicted in FIG. 4, in all four switched transceiver circuits 126 for the SCSI bus' C/D, I/O, MSG and REQ signals of the preferred embodiment, the control inputs 140 of the four receiving buffers 136 connect to the output of a single NAND gate 248 to reduce the number of logic gates. Similarly, for both switched transceiver circuits 128 for the SCSI bus' ACK and ATN signals, the control inputs 140 of the receiving buffers 136 connect to the output of a single NAND gate 248. Analogously, for all four switched transceiver circuits 126 for the SCSI bus' C/D, I/O, MSG and REQ signals, the control inputs 140 of the transmitting buffers 138 connect to the output of a single NAND gate 246. Correspondingly, for both switched transceiver circuits 128 for the SCSI bus' ACK and ATN signals, the control input 140 of the transmitting buffers 138 connect to the output signal of a single NAND gate 246.

Due to the use of these single NAND gates 246 and 248, at all times all four C/D, I/O, MSG and REQ switched transceiver circuits 126 on the interface card 48 operate in unison transmitting to or receiving signals from the SCSI bus. Similarly, both the switched transceiver circuits 128 for the ACK and ATN signals also operate in unison. Thus, when activated, the four of the switched transceiver circuits 126 included in the interface card 48 either transmit the C/D, I/O, MSG or REQ signals from one of the SCSI buses 52-58 to the control card 44 respectively via a C/D IO L, I/O IO L, MSG IO L or REQ IO L control signal lines 242, or transmit signals on those lines from the control card 44 to one of the SCSI bus 52-58. Similarly, when activated, both of the switched transceiver circuits 128 either transmit the ACK and ATN signals from one of the SCSI buses 52-58 to the control card 44 respectively via an ACK IO L or ATN IO L control signal lines 244, or conversely. (Note that FIG. 4 expressly depicts only one of each of the signal lines 242 and 244. However, dots in the connector 46 indicate the remaining three signal lines 242 and the additional signal line 244.)

In addition to the signal present on the BOARD ENB H signal line 216, each of the NAND gates 246 and 248 receives a control signal from the control card 44. Thus, the NAND gate 246 of the switched transceiver circuit 122 receives a BSY ENB H control signal via a BSY ENB H signal line 252, the NAND gate 246 of the switched transceiver circuit 124 receives a SEL ENB H control signal via a SEL ENB H signal line 254, the single NAND gate 246 for all four switched transceiver circuits 126 receives a CTL OUT H control signal via a CTL OUT H signal line 256, the single NAND gate 246 for both switched transceiver circuits 128 receives a RPLY OUT H control signal via a RPLY OUT H signal line 258, the NAND gate 246 of the switched transceiver circuit 130 receives a RST ENB H control signal via a RST ENB H signal line 260, and the NAND gates 246 in each of the nine switched transceiver circuits 132 receives a DBn ENB H control signal via a DBn ENB H signal line 262. Analogously, the single NAND gate 248 for all four switched transceiver circuits 126 receives a CTL IN H control signal via a CTL IN H signal line 264, and the single NAND gate 248 for both of the switched transceiver circuits 128 receives a RPLY IN H control signal via a RPLY IN H signal line 266.

In addition to transmitting the BOARD SELECT L signal via the BOARD SELECT L signal line 212 to control the operation of the switched buffer circuits 122-132 included in the interface card 48, the PAL 162 directly transmits, from the interface card 48 to the control card 44, both a CHANGE REQUESTED L signal via a CHANGE REQUESTED L signal line 272, and a BUS CONNECTED L signal via a BUS CONNECTED L signal line 274. The PAL 162 also receives both a BUS IDLE L signal via a BUS IDLE L signal line 276 and a DC OK L signal via a DC OK L signal line 278 directly from the control card 44. The circuit ground of the control card 44 is supplied to the interface card 48 via a GND line 282 that connects directly to the input of the transmitting buffer 138 of the switched transceiver circuit 122. Similarly, the transmitting buffer 138 included in the switched transceiver circuit 124 receives a signal from the control card 44 via a SEL OUT L signal line 284, and the buffer 138 included in each of the nine switched transceiver circuits 132 receives a signal from the control card 44 via a DBn OUT L signal line 286.

Control Card 44

Figure 5:
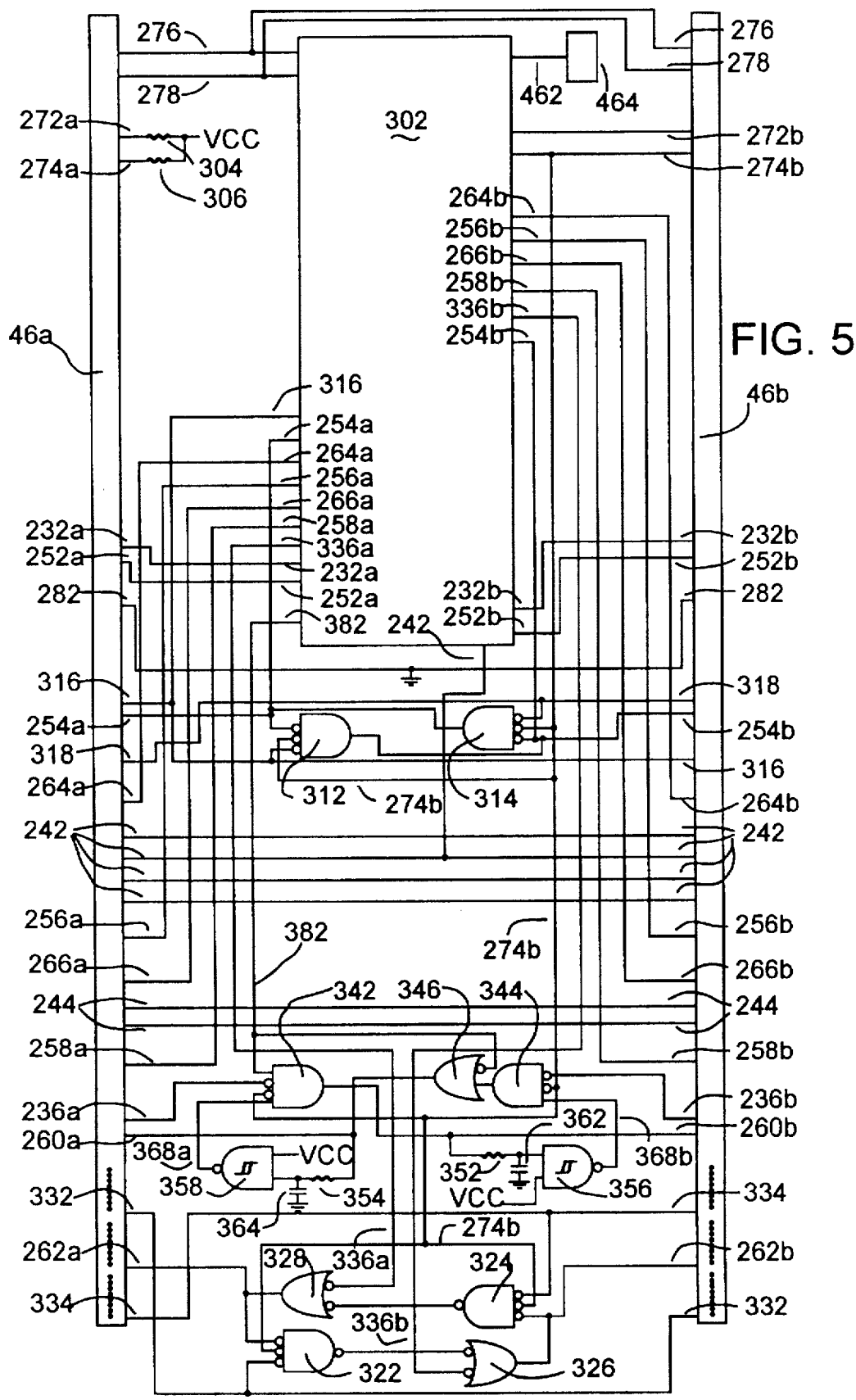
FIG. 5 is a block/logic diagram, drawn at one-half the scale of FIG. 4, depicting the control card of the bus switch of FIGS. 2 and 3 including the control card's bus switch state sequencer.

Referring now to FIG. 5, depicted there is a block diagram of the control card 44. Note, that while for pedagogical reasons FIGS. 2 and 3 depict the control card 44 as including a plurality of sharing bus interface connectors 46b, the preferred embodiment of the invention has only a single connector on the control card 44 as depicted in FIG. 5. To carry signals between the control card 44 and the sharing interface cards 48, a multi-connector ribbon cable connects to the control card 44 and connects in parallel to each of the sharing interface cards 48. For the signal lines of FIG. 5 that pass directly across the control card 44 between the same signal lines on both the shared bus interface connector 46a and the sharing bus interface connector 46b, the reference numbers in FIG. 5 are identical to those set forth in FIG. 4. For those signal lines that do not pass through the control card 44 between the connectors 46a and 46b, the reference numbers in FIG. 5 are the same as those in FIG. 4 with either the letter "a" or "b" appended to the reference number to correspond with the connector 46a or 46b to which the signal line connects. Finally, for those signal lines that pass across the control card 44 between different signal lines of the connectors 46a and 46b, the text below expressly sets forth the reference number designations.

As depicted in FIG. 5, the control card 44 includes a bus switch state sequencer 302 that exchanges signals with the PAL 162 included in each of the interface cards 48 via the signal lines 272-278. Note, however, that for the shared bus interface card 48 connected to the shared bus interface connector 46a, its output signals CHANGE REQUESTED L on line 272a and BUS CONNECTED L on line 274a are not used but are merely connected to Vcc via resistors 304 and 306 to facilitate testing.

The control card 44 includes an arbitration-latch that functions as a two-way, first-come first-served contention resolver for the SCSI bus' SEL signals received from the shared interface card 48 and from the enabled sharing interface card 48. The arbitration-latch includes two, three-input NAND gates 312 and 314. One input of each of the NAND gates 312 and 314 is cross-coupled to the output of the other gate 314 and 312 by the SEL ENB H signal lines 254a and 254b respectively from the shared bus interface connector 46a and the sharing bus interface connectors 46b. Another input to both NAND gates 312 and 314 is the signal present on the BUS CONNECTED L signal line 274b. Thus, when the signal on the BUS CONNECTED L signal line 274b is asserted, i.e. when one of the sharing bus interface cards 48 is enabled, the arbitration-latch formed by the NAND gates 312 and 314 may be set to one state or the other by the signal applied respectively to their third inputs.

The third input of the NAND gate 312 connects to a SEL A IN L to SEL B OUT L signal line 316. In addition to connecting to an input of the NAND gate 312, the signal line 316 directly connects the SEL IN L signal line 234 of the shared bus interface card 48 with the SEL OUT L signal lines 284 of all sharing bus interface cards 48 respectively connected to the several sharing-bus interface connectors 46b. Similarly, a SEL A OUT L to SEL B IN L signal line 318 connects to an input of the NAND gate 314 and directly connects the SEL OUT L signal line 284 of the shared bus interface card 48 with the SEL IN L signal line 234 of all sharing bus interface cards 48. The signal line 316 allows the signal present on the SEL signal lines of the shared data bus 58 to pass directly through the shared bus interface card 48 and the control card 44 to the input of the transmitting buffer 138 of the switched transceiver circuit 124 of all the sharing bus interface cards 48. Similarly, the signal line 318 allows the signal present of the SEL signal line of the sharing data bus 52, 54 or 56 connected to the enabled interface card 48 to pass directly through the card 48 and the control card 44 to the input of the transmitting buffer 138 of the switched transceiver circuit 124 of the shared bus interface card 48.

Assuming that the signal present on the BUS CONNECTED L signal line 274b is asserted, the circuit made up of the switched transceiver circuits 124 both in the shared bus interface card 48 and in enabled sharing bus interface card 48 together with the two NAND gates 312 and 314 functions as a bidirectional repeater for SEL signals on the SCSI bus in the following manner. While both of the SCSI bus' SEL signal lines are negated, both sides of the arbitration-latch formed by the NAND gates 312 and 314 are forced to be negated (low). Negation of the output signals from both NAND gates 312 and 314 disables the transmitting buffer 138 in the switched transceiver circuits 124 of all interface cards 48. In this state the inputs to NAND gates 312 and 314 receive the SEL signals from the SCSI buses respectively via SEL A IN L to SEL B OUT L signal line 316 and the SEL A OUT L to SEL B IN L signal line 316. When some device connected to either the shared data bus 58 or to the enabled sharing data bus 52, 54 or 56 asserts its SEL signal by driving it low, that signal passes through the switched transceiver circuit 124 on the interface card 48 receiving the asserted SEL signal to the input of one of the NAND gates 312 or 314. Application of the asserted SEL signal to the input of the NAND gates 312 or 314 causes that gate's output signal to be asserted (high). The asserted output signal from either NAND gate 312 or 314 blocks the other NAND gate 314 or 312 from responding to assertion of the SEL signal on the other SCSI bus. In addition, assertion of the output signal from the NAND gate 312 or 314 enables the transmitting buffer 138 in the switched transceiver circuit 124, on the interface card 48 that did not first receive the asserted SEL signal, to transmit that signal onto the other SCSI bus. Note that the assertion of the SEL signal on one SCSI bus reaches the other SCSI bus after a brief interval due to the circuit delay of the NAND gate 312 or 314, and the delays of the NAND gate 246 and the enabling of the transmitting buffer 138 in the switched transceiver circuit 124 that transmits the SEL signal. However, subsequent negation of the SEL signal on the first SCSI bus reaches the second SCSI bus without those delays because the transmitting buffer 138 in the switched transceiver circuit 124 is already enabled. Furthermore, negation of the SEL signal on the second SCSI bus by the transmitting buffer 138 will be removed from that bus a brief interval after the signal reaches the input of the buffer 138 because the buffer 138 is enabled when the negation signal first arrives at its input and is disabled shortly thereafter when the negation signal completes propagating through one of the NAND gates 312 or 314, one of the NAND gates 246, and the control input 140 of the switched transceiver circuit 138. Consequently, negation of the SEL signal on the first SCSI bus causes the SEL signal on the second SCSI bus to first be driven toward or even to the negated state, and then lets the line float free to be negated by the termination resistors 154 and 156 after the transmitting buffer 138 is disabled.

For reasons to be described in greater detail below, it is important to note at this juncture that signals passing through bidirectional repeaters made up of the switched transceiver circuits 124 for the SCSI bus' SEL signal both in the shared bus interface card 48 and in enabled sharing bus interface card 48 together With the two NAND gates 312 and 314 of the arbitration-latch on the control card 44 are delayed longer for transitions from the negated to the asserted state than for transitions from the asserted to the negated state. Thus, these bidirectional repeaters shorten the width of pulses that go from the negated state to the asserted state and then back to the negated state. However, because active handshaking between SCSI bus devices coordinates the ARBITRATION and SELECTION or RESELECTION phases of the SCSI bus's protocol during which these bidirectional repeaters operate, the pulse width shortening that they introduced does not adversely effect SCSI bus operation. Moreover, this pulse shortening prevents circuit malfunction such as oscillation.

Because SCSI bus devices may skip the ARBITRATION phase of the SCSI protocol and directly enter the protocol's SELECTION phase, the bidirectional repeater for the SCSI bus' SEL signal described above illustrates the simplest of all the bidirectional repeaters included in the bus switch 40. To accommodate the requirements of SCSI bus signals other than its SEL signal, the bus switch 40 includes other, more complicated bidirectional repeaters whose operation may now be more easily understood with reference to the bidirectional repeater for the SEL signal.

In addition to the bidirectional repeater for the SCSI bus' SEL signal, the control card 44 also includes nine identical bidirectional repeaters for the SCSI bus' DB0–DB7 and DBP signals only one of which is depicted in FIG. 5. Similar to the bidirectional repeater for the SEL signal, the bidirectional repeaters for the SCSI bus' DB0–DB7 and DBP signals includes an arbitration-latch that has two, three-input AND gates 322 and 324. Each of the AND gates 322 and 324 supplies its output signal respectively to an input of one of two NOR gates 326 and 328. Similar to the arbitration-latch for the SEL signal, the NOR gates 326 and 328 apply their respective output signals via the DBn ENB H signal lines 262a and 262b to inputs of the AND gates 324 and 322. Since the NOR gates 328 and 326 respectively receive the output signal from the AND gates 324 and 322, the output signals from the AND gates 322 and 324 are effectively cross-coupled in a manner similar to the cross-coupling of the NAND gates 312 and 314 described above. Similar to the arbitration-latch for the SEL signal, another input to both AND gates 322 and 324 is the signal present on the BUS CONNECTED L signal line 274b. Consequently, when the signal on the BUS CONNECTED L signal line 274b is asserted, the arbitration-latch formed by the AND gates 322 and 324 and the NOR gates 326 and 328 may be set to one state or the other by the signals applied respectively to the third inputs of the AND gates 322 and 324.

The third input of the AND gate 322 connects to a DBn A IN L to DBn B OUT L signal line 332. In addition to connecting to an input of the AND gate 322, the signal line 332 directly connects the DBn IN L signal line 238 of the shared bus interface card 48 with the DBn OUT L signal lines 286 of all sharing bus interface cards 48 connected to the several sharing bus interface connectors 46b. Similarly, a DBn A OUT L to DBn B IN L signal line 334 connects to an input of the AND gate 324 and directly connects the DBn OUT L signal line 286 of the shared bus interface card 48 with the DBn IN L signal line 238 of all sharing bus interface cards 48. The signal lines 332 in each of the nine circuits included in the control card 44 respectively allow the signal present on one of the DB0–DB7 or DBP signal lines of the shared data bus 58 to pass directly through the shared bus interface card 48 and the control card 44 to the input of the transmitting buffer 138 of the corresponding switched transceiver circuit 132 of all the sharing bus interface cards 48. Similarly, the signal lines 334 in each of the nine circuits included in the control card 44 respectively allow the signal present on one of the DB0–DB7 or DBP signal lines of the sharing data bus 52, 54 or 56 connected to the enabled interface card 48 to pass directly through the card 48 and the control card 44 to the input of the transmitting buffer 138 of the switched transceiver circuit 132 of the shared bus interface card 48.

During the ARBITRATION and SELECTION phases of the SCSI bus protocol, each of the nine identical bidirectional repeaters for the SCSI bus' DB0–DB7 and DBP signals operates similarly to that described above for the SCSI bus' SEL signal bidirectional repeater. Consequently, during the ARBITRATION and SELECTION phases of the SCSI bus protocol these nine bidirectional repeaters shorten the width of pulses that go from the negated state to the asserted state and then back to the negated state on the DB0–DB7 and DBP signal lines making up the DATA BUS portion of the SCSI bus. However, during the information phases of the SCSI bus protocol, especially during high-speed synchronous data exchanges over the SCSI bus, changing pulse width must be avoided. Accordingly, to prevent changing pulse widths during the information phases of the SCSI bus protocol, the bus switch state sequencer 302 supplies signals to an input of one of the NOR gates 326 or 328 respectively via a DATA A TO B L signal line 336b or a DATA B TO A L signal line 336a to override the operation of the arbitration-latch. Overriding the arbitration-latch signals with a signal supplied on either of the lines 336a or 336b by the bus switch state sequencer 302 enables one or the other of the transmitting buffers 138 in all nine switched transceiver circuits 132. Enabling one or the other transmitting buffers 138 in all nine switched transceiver circuits 132 forces DB0–DB7 and DBP signal transfers to occur in one direction or the other between the shared data bus 58 and the sharing data bus 52, 54 or 56 connected to the enabled interface card 48. Continuously enabling the transmitting buffers 138 in this way irrespective of the actual state of signals present on the DB0–DB7 and DBP signal lines prevents changing the width of pulses on the SCSI buses' DB0–DB7 and DBP signal lines.

The control card 44 also includes a third different type of bidirectional repeater for the RST signals of the two SCSI buses. Similar to the other bidirectional repeaters, the bidirectional repeater for the RST signals includes an arbitration-latch that has two AND gates 342 and 344. As depicted in FIG. 5, the AND gate 342 receives four input signals while the AND gate 344 receives only three. The AND gate 344 supplies its output signal to an input of an OR gate 346. The AND gate 342 and the OR gate 346 supply their output signals respectively via the RST ENB H signal lines 260a and 260b through resistors 352 and 354 to inputs of Schmitt triggers 356 and 358. Capacitors 362 and 364 are respectively connected between circuit ground and the junction of the resistors 352 and 354 with the inputs to the Schmitt triggers 356 and 358. The other inputs of the Schmitt triggers 356 and 358 are connected to Vcc. Analogous to the NOR gates 326 and 328, each of the Schmitt triggers 356 and 358 supplies its output signal to inputs of the AND gates 342 and 344 respectively via RST DEL L signal lines 368a and 368b. The Schmitt triggers 356 and 358 and the signal lines 368a and 368b cross-couple the AND gates 342 and 344 in a manner similar to the cross-coupling of the NAND gates 312 and 314, and AND gates 322 and 326 described above. Similar to the arbitration-latches for the SEL, DB0–DB7 and DBP signals of the SCSI buses, the BUS CONNECTED L signal line 274b connects to inputs of the AND gates 342 and 344.

The third input to the AND gate 342 connects to the RST IN L signal line 236a from the shared interface card 48 while the third input to the AND gate 344 connects to the RST IN L signal line 236b from all the sharing interface cards 48. Differing from the bidirectional repeaters for the SEL, DB0–DB7 and DBP signals of the SCSI buses, the switched transceiver circuit 130 for the SCSI bus' RST signal lacks an "OUT L" signal line. Consequently, the signal present RST IN L signal line of one interface card 48 cannot become an input signal to the transmitting buffer 138 in the switched transceiver circuits 130 of the other interface card 48. Rather the inputs of both transmitting buffers 138 in the switched transceiver circuits 130 of both interface cards connect to circuit ground. The connection of the inputs of both transmitting buffers 138 to circuit ground is necessary because the SCSI bus' RST signal line carries a wire-OR signal that can be simultaneously asserted by as many as all devices connected to the bus. Connecting the input of the transmitting buffer 138 to circuit ground causes the buffer 138 to assert its output signal when it is enabled by the RST ENB H signal on the signal line 260 and to let the RST signal line float free to be negated by the termination resistors 154 and 156 after the transmitting buffer 138 is disabled.

If the Schmitt triggers 356 and 358, the resistors 352 and 354 and the capacitors 362 and 364 were omitted from the arbitration-latch for the SCSI bus' RST signal, then differences in RST signal's propagation delays through one of the AND gates 342 or 344 and the switched transceiver circuits 130 back to the AND gates 344 or 342 could produce a pulse that circulates forever within the bidirectional repeater. Such a pulse circulating within the bidirectional repeater would, of course, repetitively present all the devices connected to both SCSI buses with a RST signal each time the pulse went around the circuit. The combined Schmitt triggers 356 and 358, the resistors 352 and 354 and the capacitors 362 and 364 delay the propagation of the signals from the outputs of the AND gate 342 and the OR gate 346 to the inputs respectively of the AND gates 342 and 344 sufficiently long to suppress generation of a circulating pulse.

The arbitration-latch for the SCSI bus' RST signal differs from all other arbitration-latches in the bus switch 40 by being asymmetric. That is, the output signal from the AND gate 342 goes directly to the resistor 352 whereas the output signal from the AND gate 344 passes through the OR gate 346 before application to the resistor 354. Another asymmetry in this arbitration-latch is the four inputs of the AND gate 342 versus the three inputs of the AND gate 344. The bus switch 40 includes this asymmetry to permit a RESET SHARED DEVICES ON SELECTION L signal, supplied from the bus switch state sequencer 302 to an input of the OR gate 346 via a RESET SHARED DEVICES ON SELECTION L signal line 382, to cause all SCSI devices connected to the shared data bus 58 to be reset upon enabling one of the sharing interface cards 48. Application of this same RESET SHARED DEVICES ON SELECTION L signal to the fourth input of the AND gate 342 prevents assertion of the RST signal on the shared data bus 58 from propagating through the RST signal's arbitration-latch to the enabled sharing data bus 52, 54 or 56.

The other bidirectional repeaters included in the bus switch 40 for the SCSI bus' C/D, I/O, MSG, REQ, ACK and ATN are not used in the SCSI bus's ARBITRATION phase. Of these six signals, only the SCSI bus' I/O signal participates in the bus' SELECTION or RESELECTION phases in which the signal originates at the winning arbitrating device. In addition, during all phases of the SCSI bus protocol other than BUS FREE and ARBITRATION phases, the initiator may, at any time, assert ATN to which the target may optionally respond by executing a MESSAGE OUT phase of the SCSI bus protocol. Finally, during the SCSI bus' information phases the signals REQ, I/O, C/D AND MSG pass only from the target to the initiator device while, conversely, the ATN and ACK signals pass only from the initiator to the target. Consequently, the bidirectional repeaters for those signals do not require an arbitration-latch such as those included on the control card 44 for the SEL, DB0-DB7, DBP and RST signals. Rather, as illustrated in FIG. 5, the relevant signal lines 242 and 244 pass directly through the control card 44 between the shared bus interface card connector 46a and the sharing bus interface card connector 46b.

Other than for the SCSI bus' I/O signal present on the I/O IO L signal line 242, none of the other signals present on the four signal lines 242 and the two signal lines 244 passing through the control card 44 influences the operation of the bus switch 40. With regard to the SCSI bus' I/O signal, that signal is used in controlling the operation of the bus switch 40. Accordingly, FIG. B 5 illustrates that only the I/O IO L signal line 242, of the four signal lines 242, connects to the bus switch state sequencer 302.

The preceding description of the various bidirectional repeaters, both those that include and those that lack an arbitration-latch, has encompassed all of the SCSI bus' signals except its BSY signal. For the BSY signal, the bus switch state sequencer 302 receives the signals present on the BSY IN L signal lines 232a and 232b respectively from both the shared bus interface card 48 and from all the sharing bus interface cards 48. Digital logic in the switch state sequencer 302 processes the BSY signals received from both SCSI buses via the shared bus interface card 48 and the enabled sharing bus interface card 48 to produce two BSY ENB H control signals. The bus switch state sequencer 302 transmits one BSY ENB H control signal to the transmitting buffer 138 of the switched transceiver circuit 122 in the shared bus interface card 48 and the other BSY ENB H control signal to the enabled sharing bus interface card 48 respectively via the BSY ENB H signal lines 252a and 252b. Because, similar to the RST signal, the SCSI bus's BSY signal line is a wire-OR signal, the input of the transmitting buffer 138 of the switched transceiver circuit 122 connects to circuit ground the same as the connection of the transmitting buffer 138 in the switched transceiver circuit 130 for the SCSI bus' RST signal. Accordingly, similar to the switched transceiver circuit 130 for the RST signal, the switched transceiver circuit 122 never actively negates the BSY signal. The following discussion of the bus switch state sequencer 302 more fully explains its operation for generating these two BSY ENB H signals together with other signals for controlling the operation of the bus switch 40.
Bus Switch State Sequencer 302

Figure 6A:
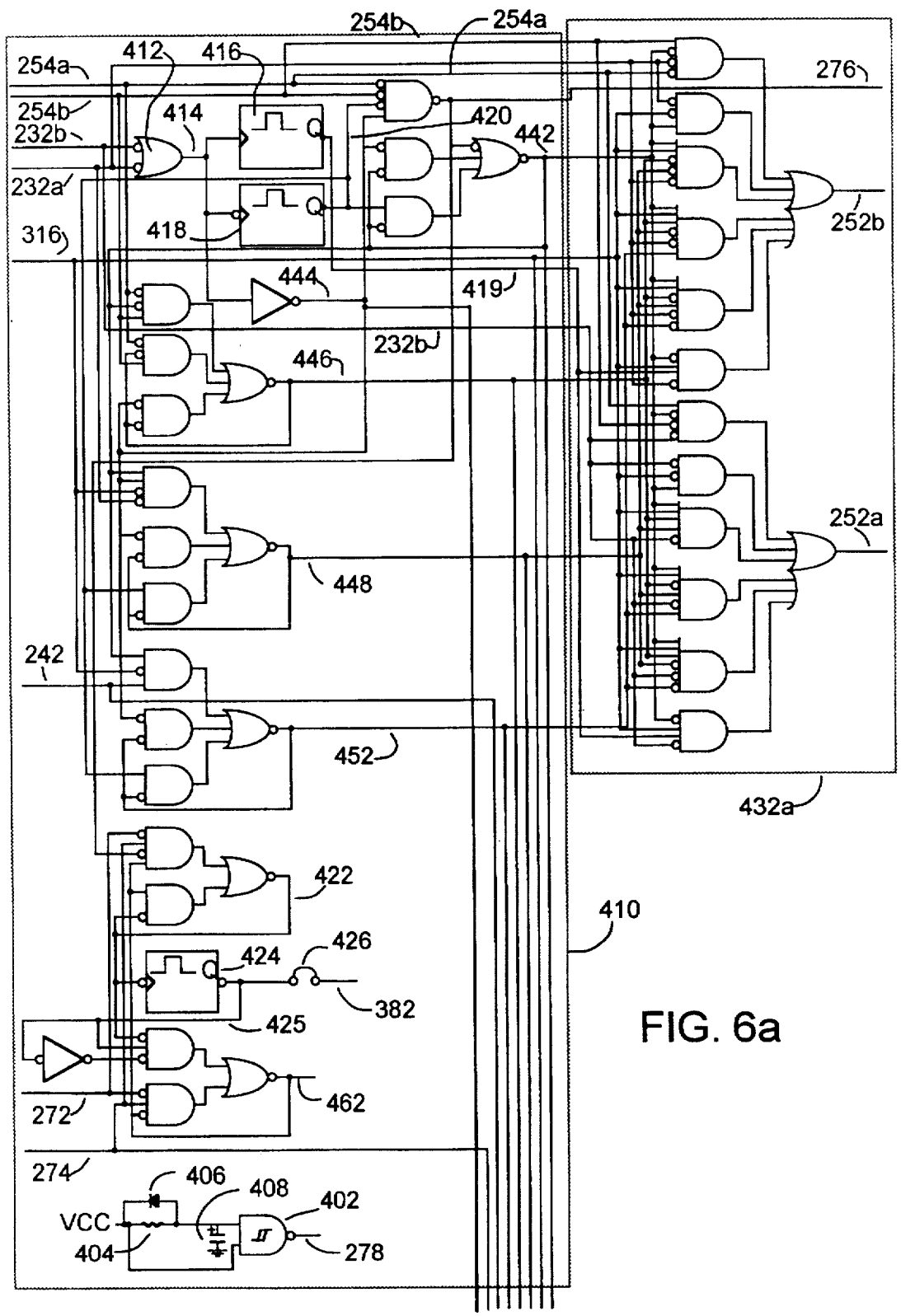
FIGS. 6a and 6b, is a logic diagram depicting the control card's bus switch state sequencer.
Figure 6B:
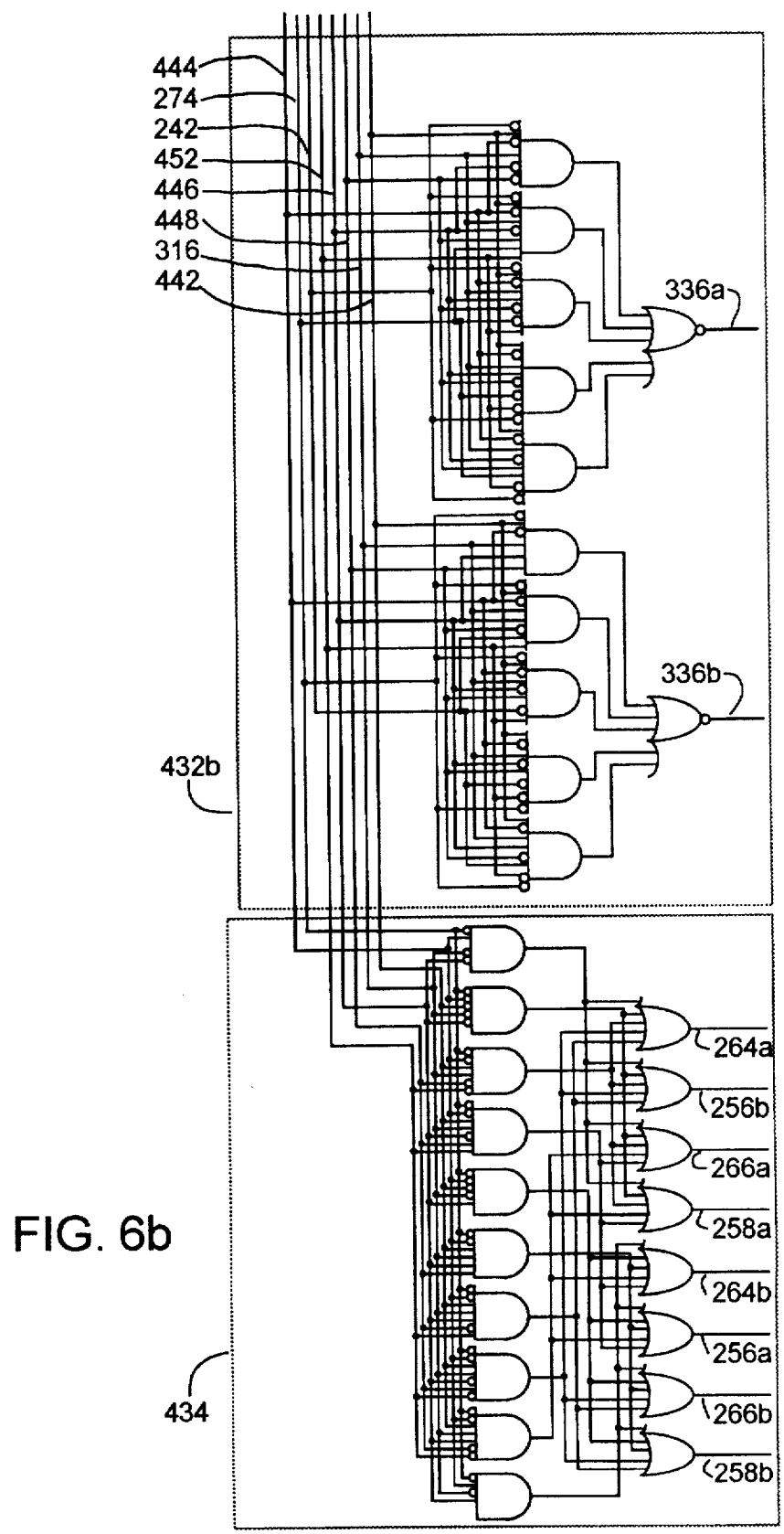

FIG. 6, made up of FIGS. 6a and 6b, is a logic diagram depicting the bus switch state sequencer 302 that is included in the control card 44. Depicted in FIG. 6 is a circuit for disabling the operation of the bus switch 40 for a short interval after it initially receives electrical power and until that power stabilizes. This circuit, located in the bus switch state sequencer 302, includes a Schmitt trigger 402 that transmits a DC OK L signal to all of the interface cards 48 via the DC OK L signal line 278. To sense the state of the electrical power in the bus switch 40, one input of Schmitt trigger 402 connects directly to Vcc while its other input connects to Vcc through a parallel network made up of a resistor 404 and a diode 406 that has its anode connected to the input of the Schmitt trigger 402 and its cathode connected to Vcc. In addition to the resistor 404 and the diode 406, this input of the Schmitt trigger 402 connects to one terminal of a capacitor 408, the other terminal of which connects to circuit ground. When power is first applied to the bus switch 40, output signal from the Schmitt trigger 402 is negated. Subsequently while power continues to be applied to the bus switch 40, current, flowing through the resistor 404, charges the capacitor 408 above the threshold of the Schmitt trigger 402. When the voltage on the capacitor 408 exceeds the Schmitt trigger's threshold, its DC OK L output signal is asserted thereby enabling the interface cards 48 to respond to signals from the control card 44, to signals on the SCSI bus 52-58 to which the interface cards 48 respectively connect, and to a signal from the toggle switch 84 on the shared bus-request cables 78 that are respectively associated with the sharing SCSI buses 52-56 or to a signal from the selector switch 88 illustrated in FIG. 3.

In addition to the circuit for disabling the operation of the bus switch 40, the bus switch state sequencer 302 depicted in FIG. 6 includes a latching-sequencer and a decoder/encoder that, in response to signals occurring on the shared data bus 58 and the enabled one of the sharing data buses 52, 54 or 56, generates output signals which control the operation of the bus switch 40. In the preferred embodiment of the invention, most of the logic circuitry depicted in FIG. 6 actually resides in a plurality of PALs to be described in greater detail below. In addition to that portion of the logic circuitry depicted in FIG. 6 which resides in the plurality of PALs, all of the gates 312, 314, 322, 324, 326, 328, 342, 344 and 346 depicted in FIG. 5 also reside in those-same PALs.

Accordingly, the logic diagrams of FIGS. 5 and 6 illustrate the construction of the bus switch 40 from a pedagogical viewpoint rather than conforming to the actual implementation of the preferred embodiment. To increase comprehension, the logic circuitry depicted in FIG. 6 omits or simplifies certain details of the actual implementation of the bus switch 40, e.g. details related to logic minimization and to the elimination of logic "hazards," even logic hazards arising from transitions between phases of the SCSI bus protocol. Moreover, the logic diagram of FIG. 6 also omits details related to circuit loading such as line drivers included in the preferred embodiment for the signal lines. RPLY IN H 266a and 266b, RPLY OUT H 258a and 258b, CTL IN H 264a and 264b, CTL OUT H 256a and 256b, BSY ENB H 252a and 252b. However, while FIG. 6 does not precisely depict the structure of the preferred embodiment, the detailed structure of the portion of the control card 44 residing in the PALs is expressly set forth in their description below. Accordingly, in the following discussion of FIG. 6 all logic devices that are not expressly referred to by a reference number reside in one of the PALs.

To allow the bus switch 40 to properly transmit signals between the shared data bus 58 and the enabled sharing data bus 52, 54 or 56, the bus switch state sequencer 302 operates in the following manner. Assuming that both the shared data bus 58 and the enabled sharing data bus 52, 54 or 56 are in the BUS FREE phase of the SCSI bus' protocol, the bus switch state sequencer 302 is in a quiescent state receiving the negated BSY signals both from the bus 58 and from one of the buses 52, 54 or 56. If one or more devices on the shared data bus 58 asserts BSY, the bus switch state sequencer 302 responds by causing the transmitting buffer 138 in the enabled sharing bus interface card 48 to assert BSY on the BSY control signal line 102 in the enabled sharing data bus 52, 54 or 56. The associated receiving buffer 136 of the enabled sharing interface card 48 then receives this assertion of the BSY signal from the transmitting buffer 138 via the BSY control signal line 102 and feeds that signal back to the bus switch state sequencer 302. In response to this assertion of the BSY signal, the bus switch state sequencer 302 causes the transmitting buffer 138 in the shared bus interface card 48 to also assert BSY on the shared data bus 58 together with the arbitrating device connected thereto. Feedback of the asserted BSY signal from this transmitting buffer 138 via the BSY control signal line 102 of the shared data bus 58 to the associated receiving buffer 136 then latches the BSY signal on both of the composite buses 52–58, 54–58 or 56–58 in the asserted state regardless of subsequent negation of the BSY signal by all arbitrating devices. Conversely, if the device asserting BSY were rather located on the enabled sharing data bus 42, 54 or 56, the bus switch 40 operates the same except that the feedback occurs first between the transmitting buffer 138 and the receiving buffer 136 of the shared interface card 48 and then between the buffers 138 and 136 of the enabled sharing interface card 48. Consequently, during the ARBITRATION phase of the SCSI bus's protocol, irrespective of the location on the buses 52–58 of an arbitrating device, the bus switch 40 always asserts and latches BSY on both buses of the composite bus 52–58, 54–58 or 56–58 in addition to the assertion of BSY on one or both of them by arbitrating devices. This multiple assertion of BSY signals both by the arbitrating device and by the bus switch 40 causes no problem because the SCSI bus' BSY signal line is a wire-OR signal line.

The bus switch 40 asserts the BSY signal both on the shared data bus 58 and on the enabled sharing data bus 52, 54 or 56 to prevent a glitch in the BSY signal if the device that first asserted its BSY signal loses the arbitration to another device that is on the opposite side of the bus switch 40. If the bus switch 40 did not assert the BSY signal on both buses but rather, transmitted it through a bidirectional repeater such as that for the SEL signal, then when the losing device that began the arbitration by asserting its BSY signal subsequently negated that signal because it lost the arbitration, the BSY signal on that device's bus would be negated for a brief interval until the bidirectional repeater switched to drive the BSY signal in the opposite direction. The bus switch 40 avoids the possibility of such a glitch in the BSY signal by asserting the BSY signal on both the shared data bus 58 and on the enabled sharing data bus 52, 54 or 56.

Concurrent with receipt of the BSY signal by the bus switch 40 and its retransmission of that signal onto both buses, the bidirectional repeaters for the SCSI bus' DB0–DB7 signals also appropriately retransmit the assertion of any of those signals from the bus 52, 54, 56 or 58 on which they are asserted onto the bus 52, 54, 56 or 58 on which they are not asserted. Unidirectional transmission of the SCSI bus' DB0–DB7 signals by the bidirectional repeaters is necessary because the SCSI bus' DB0–DB7 signal lines do not carry wire-OR signals. Accordingly, during the SCSI bus' ARBITRATION phase, the bidirectional repeaters for the SCSI bus signals DB0–DB7 may transmit one of those signals from the shared data bus 58 to the enabled sharing data bus 52, 54 or 56 while another one of the DB0–DB7 signals is transmitted in the opposite direction.

Shortly before the end of the SCSI bus' ARBITRATION phase, the winning arbitrating device asserts the SCSI bus' SEL signal which passes through the bidirectional repeater included in the bus switch 40 for the SEL signal. Assertion of the SCSI bus' SEL signal by the winning arbitrating device reveals to the bus switch state sequencer 302 on which side of the bus switch 40 the winning device is located. Accordingly, immediately after assertion of the SCSI bus' SEL signal, the bus switch state sequencer 302 breaks the feedback path and removes its assertion of the BSY signal on the bus 52, 54, 56 or 58 on which the winning device is located and, responsive to assertion of the BSY signal by the winning device, continues to assert that signal only on the other bus 52, 54, 56 or 58, on which a subsequently selected device may be located. When the bus switch 40 terminates its assertion of the BSY signal on the bus 52, 54, 56 or 58 on which the winning device is located, it thereby unlatches assertion of the BSY signal.

Because the ARBITRATION phase of the SCSI bus' protocol is followed by either a SELECTION phase or a RESELECTION phase during which the winning device indicates which of those particular phases by negating or asserting the I/O signal, and because the winning device may be an initiator capable of asserting the ATN signal during the SELECTION phase, during the SELECTION or RESELECTION phase the C/D IO L, I/O IO L, MSG IO L and REQ IO L switched transceivers 126 and the ACK and ATN switched transceivers 128 on both the shared and enabled sharing interface cards 48 are all enabled to transmit signals only from the bus 52, 54, 56 or 58 on which the winning device is located to the bus 52, 54, 56 or 58 on which the selected device may be located. (Note, the preceding operation of the bus switch state sequencer 302 with respect to the common transmission direction for the C/D, I/O, MSG and REQ control signal lines 106 and the ACK and ATN control signal lines 108, while slightly simplifying the digital logic included in the sequencer 302, does not strictly follow the ANSI specification for the SCSI bus. The preceding operation is in accordance with the ANSI specification during the SELECTION phase, but contravenes the ANSI specification during the RESELECTION phase. Strict accordance with the ANSI specification requires that the ATN control signal line 108 be enabled for transferring signals from the selected device to the winning device during the RESELECTION phase of the SCSI bus protocol, rather than from the winning device to the selected device. Thus far, experimental testing of a bus switch 40 constructed in accordance with the description set forth herein has not revealed any operational difficulties arising from this deviation from the ANSI specification. Furthermore, if operational difficulties do arise in the future from this aspect in the operation of the bus switch 40, only a minor change is required in the digital logic of the bus switch state sequencer 302 to conform its operation to the ANSI specification.)

During the SELECTION or RESELECTION phases of the SCSI bus' protocol, the winning device continues to assert the SCSI bus' SEL signal while negating the SCSI bus' BSY signal and simultaneously asserting its address and the address of the device it wishes to select on the SCSI bus' DB0-DB7 signal lines. Assertion of the SCSI bus' BSY signal during the SELECTION phase of the SCSI bus' protocol by the selected device in response to the winning device's assertion of the SEL signal reveals, to the bus switch state sequencer 302, the selected device's location on one side or the other of the bus switch 40. In response to assertion of the SCSI bus's BSY signal by the selected device, the bus switch state sequencer 302 once again, as at it did at the beginning of the ARBITRATION phase, causes the bus switch 40 to assert BSY both on the shared data bus 58 and on the enabled sharing data bus 52, 54 or 56. As set forth above, assertion of the SCSI bus' BSY signal on both buses 52 and 52, 55 or 56 during the SELECTION or RESELECTION phases of the SCSI bus protocol causes no problem because the BSY signal line is a wire-OR signal. Moreover, during the RESELECTION phase of the SCSI bus protocol, both the winning device and the selected device simultaneously assert the SCSI bus's BSY signal. At the end of the SCSI bus' SELECTION phase when the winning device negates SEL, the bus switch state sequencer 302 removes its assertion of BSY from the bus 52, 54, 56 or 58 on which the selected device is located thereby again unlatching assertion of the BSY signal and giving sole control of the BSY signal to the selected device. At the end of the SCSI bus' RESELECTION phase when the winning device negates SEL and asserts BSY, the bus switch state sequencer 302 removes its assertion of BSY from the bus 52, 54, 56 or 58 on which the winning device is located thereby again unlatching assertion of the BSY signal and giving sole control of the BSY signal to the winning device.

From the preceding description of the responses of the bus switch 40 to signals during the SCSI bus' ARBITRATION and SELECTION or RESELECTION phases, it is apparent that during those phases, digital logic circuits, included in a latching-sequencer 410 of the bus switch state sequencer 302 that is enclosed within a dashed rectangle in FIG. 6, store information indicating whether the initiator and target are both on the shared data bus 58, whether the initiator and target are both on one of the sharing data buses 52, 54 or 56, whether the initiator is on the shared data bus 58 with the target on one of the sharing buses 52, 54 or 56, or whether the initiator is on one of the sharing buses 52, 54 or 56 and the target is on the shared data bus 58. Since in only the third and fourth instances listed above will data transmission pass between the devices through the bus switch 40, only in those instances must the bus switch 40 respond further to signals on the SCSI bus until the next BUS FREE phase occurs. However, in the preferred embodiment of the bus switch 40 in the first and second instances the signals on the single bus 52, 54, 56 or 58 to which both devices connect are transmitted through the bus switch 40 to the other bus 52, 54, 56 or 58. In the third and fourth instances listed above, the information obtained by the bus switch state sequencer 302 during the ARBITRATION and SELECTION or RESELECTION phases allows it to provide control signals that properly configure the shared interface card 48 and the enabled sharing interface card 48 for exchanging data between the shared data bus 58 and the enabled sharing data bus 52, 54 or 56 during the subsequent information exchange phases. Accordingly, in the third and fourth instances at the end of the SELECTION phase the bus switch state sequencer 302 enables the switched transceiver circuits 126 for the C/D, I/O, MSG, and REQ control signal lines 106 to transfer signals from the target to the initiator, and enables the switched transceiver circuits 128 for the ACK and ATN control signal lines 108 to transfer signals from the initiator to the target.

To identify the locations of the initiator and target of a SCSI bus data transmission during the ARBITRATION and SELECTION or RESELECTION phases of the SCSI bus' protocol and to store that information for use during subsequent information phases, the bus switch state sequencer 302 includes a plurality of latches within the sequencer 410 arranged vertically on the left hand side of FIG. 6. These latches respond to signals on the SEL ENB H signal lines 254a and 254b which respectively come from the outputs of the NAND gates 314 and 312. The latches also respond to signals on the BSY IN L signal lines 232a and 232b after those signals have been ORed together in a NOR gate 412 to produce a BSY A+B signal on a BSY A+B H signal line 414. In addition to connecting to the latches of the sequencer 410, the BSY A+B H signal line 414 connects to the inputs of a pair of monostable multivibrators 416 and 418.

Via a BSY DOWN TIMER H signal line 419, the monostable multivibrator 416 transmits a four millisecond pulse upon assertion of the BSY signal on either the shared data bus 58 or the enabled sharing data bus 52, 54 or 56. If the bus switch 40 latches both SCSI bus BSY signal lines in the asserted state in response to a glitch on either BSY IN L signal line 232a or 232b, such as that produced by Apple Computer's Macintosh when it is turned on, expiration of the four millisecond interval established by the monostable multivibrator 416 negates the BSY ENB H signals from both signal lines 252a and 252b. Negating the BSY ENB H signals from the signal lines 252a and 252b disables the transmitting buffers 138 in both switched transceiver circuits 122 in the shared bus interface card 48 and in the enabled sharing bus interface card 48. Disabling both of the transmitting buffers 138 at the end of the four millisecond interval returns the SCSI bus once again to its BUS FREE phase. Thus, the monostable multivibrator 416 prevents latching up the SCSI bus's BSY signal lines in response to glitches on those signal lines.

Via a BSY UP TIMER H signal line 420, the monostable multivibrator 418 transmits a four hundred nanosecond pulse upon the negation of the BSY A+B signal, i.e. upon the negation of both BSY signals from the shared data bus 58 and the enabled sharing data bus 52, 54 or 56. In accordance with the ANSI standard for the SCSI bus, the output signal from the monostable multivibrator 418 inhibits the bus switch state sequencer 302 from responding to the negation of SCSI bus' BSY control signal line 102 unless and until the BSY control signal line 102 has been negated continuously for four hundred nanoseconds.

In addition to the signals on the signal lines 254a, 254b, 232a and 232b, the latches of the sequencer 410 also respond to a signal present on the SEL A IN L to SEL B OUT L signal line 316, and to a signal on the I/O IO L signal line 242. (Recall that as described above, the I/O IO L signal line 242 is the only one of the four signal lines 242 that influences the operation of the bus switch 40.) Finally, the latches of the sequencer 410 respond to signals from the several sharing bus interface cards 48 on the CHANGE REQUESTED L signal line 272b and on the BUS CONNECTED L signal line 274b.

Within the bus switch state sequencer 302, a SELECT L signal line 422 connects an output from a latch located within one of the PALs to an input of a monostable multivibrator 424. The monostable multivibrator 424 transmits a four millisecond long pulse on a RESET TIMER L signal line 425 whenever a new sharing bus interface card 48 is selected. Among other things, if a jumper 426 is installed on the bus switch state sequencer 302, the pulse generated by the monostable multivibrator 424 is transmitted from the RESET TIMER L signal line 425 to the arbitration-latch for the SCSI bus' RST signals via the RESET SHARED DEVICES ON SELECTION L signal line 382. In this way, a pulse on the RESET SHARED DEVICES ON SELECTION L signal line 382 resets all devices connected to the shared data bus 58 upon enabling one of the sharing interface cards 48.

Within the bus switch state sequencer 302, the latches of the sequencer 410 located along the left hand side of FIG. 6 produce several output signals that are applied as input signals to encoders 432a and 432b and to a decoder/encoder 434 which are located along the right hand side of FIG. 6 and respectively enclosed within dashed rectangles. The encoders 432a and 432b and the decoder/encoder 434 produce output signals from the bus switch state sequencer 302 that control the operation of the bus switch 40 in response to signals on the SCSI buses 52-58. Thus the encoder 432a produces the BSY ENB H signals that are respectively transmitted via the BSY ENB H signal lines 252a and 252b respectively to the switched transceiver circuits 122 located in the shared bus interface card 48 and in all the sharing bus interface cards 48. The encoder 432b produces the DATA A TO B L and DATA B TO A L signals that are respectively transmitted over the DATA A TO B L signal line 336a and the DATA B TO A L signal line 336b to inputs of the NOR gates 328 and 326 included in each of the nine arbitration-latches for the SCSI bus' DB0-DB7 and DBP signal lines.

The decoder/encoder 434 included in bus switch state sequencer 302 produces the CTL IN H signals transmitted over the CTL IN H signal lines 264a and 264b and the CTL OUT H signals transmitted respectively over the CTL OUT H signal lines 256a and 256b. The signals transmitted over the signal lines 264a and 256a, and 264b and 256b control the operation of the switched transceiver circuits 126 for the SCSI bus's C/D, I/O, MSG and REQ signals respectively on the shared bus interface card 48 and on the sharing bus interface cards 48. The decoder/encoder 434 also produces the RPLY IN H signals transmitted respectively over the RPLY IN H signal lines 266a and 266b and the RPLY OUT H signals transmitted respectively over the RPLY OUT H signal lines 258a and 258b. The signals transmitted over the signal lines 266a and 258a, and 266b and 258b control the operation of the switched transceiver circuits 128 for the SCSI bus's ACK and ATN signals respectively of the shared and of the sharing bus interface cards 48.

Various signals both from outside and inside the bus switch state sequencer 302 influence the output signals from the encoders 432a and 432b and also the decoder/encoder 434. Thus, the SCSI bus's SEL signal on the shared data bus 58 that is supplied to the bus switch state sequencer 302 on the SEL A IN L to SEL B OUT L signal line 316 influences the output signals from the encoders 432a and 432b and also the decoder/encoder 434. Similarly, the initiator's SCSI bus' I/O signal supplied to the bus switch state sequencer 302 on the I/O IO L signal line 242 influences the output signals of the encoders 432a and 432b and also the decoder/encoder 434. Correspondingly, the bus switch's BUS CONNECTED L signal on line 274b supplied to the bus switch state sequencer 302 on the BUS CONNECTED L signal line 274b from the enabled sharing interface card 48 influences the output signals from the encoders 432a and 432b and also the decoder/encoder 434. Finally, various other signals produced internally within the bus switch state sequencer 302 by the latching-sequencer 410 also influence the output signals from the encoders 432a and 432b and also the decoder/encoder 434.

One of the signals produced by the latching-sequencer 410 is an IDLE+ARB signal that is supplied to the encoders 432a and 432b and the decoder/encoder 434 via an IDLE+ARB L signal line 442. When both the shared data bus 58 and the enabled sharing data bus 52, 54 or 56 are in the BUS FREE phase of the SCSI protocol, the IDLE+ARB signal is forced into the asserted state (low). When at the commencement of the SCSI bus' ARBITRATION phase when the bus' BSY signal is asserted by an arbitrating device, the IDLE+ARB signal becomes latched in its asserted state. The IDLE+ARB signal remains latched in the asserted state throughout the remainder of the ARBITRATION phase and into the SELECTION or RESELECTION phase until the BSY signal has been negated and the time interval created by the monostable multivibrator 418 in response to negation of the BSY signal expires. At the expiration of the time interval created by the monostable multivibrator 418, the IDLE+ARB signal is forced into the negated state (high) to be latched in that state at the end of the SELECTION or RESELECTION phase when the SCSI bus' BSY signal is reasserted. Alternatively, in a non-arbitration SCSI bus system having a single initiating device the IDLE+ARB signal is forced into the asserted state during the BUS FREE phase of the SCSI bus protocol before a device asserts its SEL signal to start a transaction. Upon assertion of the SCSI bus' SEL signal in a non-arbitration system, the IDLE+ARB signal is negated and then latched in that state at the end of the SELECTION phase upon the assertion of the SCSI bus' BSY signal.

Another signal that the encoders 432a and 432b and the decoder/encoder 434 receive from the latching-sequencer 410 via a BSY A+B DELAYED L signal line 444 is the BSY A+B DELAYED signal. This signal is merely the OR of the BSY signals from the shared data bus 58 and the enabled sharing data bus 52, 54 or 56.

The encoders 432a and 432b and the decoder/encoder 434 also receive a WINNER A signal from the latching-sequencer 410 via a WINNER A L signal line 446. If the winning arbitrating device is connected to the shared data bus 58, then at the beginning of the SCSI bus' SELECTION phase the SEL signal line on the bus 58 is asserted. Assertion of the SEL signal on the bus 58 during the SCSI bus's SELECTION phase causes the signal on the WINNER A L signal line 446 to be latched in the asserted state. If the signal on the WINNER A L signal line 446 is latched in the asserted state, it will remain in that state as long as either the BSY signal or the SEL signal remains asserted on the composite bus made up of the shared data bus 58 and the enabled sharing data bus 52, 54 or 56, i.e. for the rest of the transaction.

The latching-sequencer 410 also transmits a SELECTED DEVICE A signal to the encoders 432a and 432b and the decoder/encoder 434 via a SELECTED DEVICE A L signal line 448. The signal on the SELECTED DEVICE A L signal line 448 latches in the asserted state if the bus switch state sequencer 302 receives a BSY signal first from the shared data bus 58 during the brief interval in the SELECTION phase of the SCSI bus' protocol before the sequencer 302 receives the retransmission of that signal back from the enabled sharing data bus 52, 54 or 56. If the signal on the SELECTED DEVICE A L signal line 448 is latched in the asserted state, it will remain in that state as long as either the BSY signal or the SEL signal remains asserted on the composite bus made up of the shared data bus 58 and the enabled sharing data bus 52, 54 or 56, i.e. for the rest of the transaction.

Another signal that the encoders 432a and 432b and the decoder/encoder 434 receive from the latching-sequencer 410 via a RESELECT L signal line 452 is the RESELECTION signal. This signal is latched in the asserted state if the SCSI bus' I/O signal is asserted by the winning device in the SCSI bus phase immediately following the ARBITRATION phase. Latched in the asserted state, the RESELECTION signal indicates that a SCSI bus RESELECTION is taking place rather than a SELECTION. In accordance with the SCSI bus' ANSI standard, after a RESELECTION the winning device becomes the target and the selected device is the initiator. If the signal on the RESELECT L signal line 452 is latched in the asserted state, it will remain in that state as long as either the BSY signal or the SEL signal remains asserted on the composite bus made up of the shared data bus 58 and the enabled sharing data bus 52, 54 or 56, i.e. for the rest of the transaction.

Once the states of the WINNER A, SELECTED DEVICE A, and RESELECTION signals have all been latched by the end of the SELECTION phase of the SCSI bus protocol, the encoders 432a and 432b and the decoder/encoder 434 then produce appropriate signals on the signal lines RPLY IN H 266a and 266b, RPLY OUT H 258a and 258b, CTL IN H 264a and 264b, CTL OUT H 256a and 256b, BSY ENB H 252a and 252b to control the operation of the bus switch 40 during subsequent phases of the transaction until the SCSI bus once again returns to the BUS FREE phase with BSY and SEL unasserted.

Programmable Array Logic

As described above, in the preferred embodiment of the present invention, most of the digital logic circuitry on the control card 302 is implemented with PALs. The following table lists those PALs and provides a brief description of their function. The type numbers set forth in the table below are JEDEC designations for PALs such as those manufactured by Monolithic Memories Inc. ("MMI"). Type 2217 is an MMI 16L8, and type 2226 is an MMI 20L8. Each of the IC nos. listed below associate a particular PAL with a subsequent signal line to pin number assignment table, and with a subsequent PAL map listing.

| IC No. | Type Function |
|---|---|
| U1 | 2226 Arbitration-latches for SCSI bus DB0–DB3 signal lines |
| U2 | 2217 Arbitration-latches for SCSI bus RST, SEL and DBP signal lines excluding the Schmitt triggers 356 and 358 of the RST signal's arbitration-latch |
| U5 | 2226 Arbitration-latches for SCSI bus DB4–DB7 signal lines |
| U6 | 2217 Encoder/decoder 424 |
| U8 | 2217 Decoder 432b and the portion of the |

-continued

| IC No. | Type Function |
|---|---|
| U10 | latching-sequencer 410 that controls interface card selection excluding the monostable multivibrator 424<br>2217 Decoder 432a and the portion of the latching-sequencer 410 that controls bus state sequencing excluding the NOR gate 412 and the monostable multivibrators 416 and 418 |

The preceding PAL type numbers are for PALs manufactured by Monolithic Memories Inc. The following table lists the reference numbers of signal lines described in the preceding text and specifies the particular pin numbers of the various PALs to which that signal line connects. In the following table, the notation "(L)" indicates that an output signal from the PAL is supplied to an inverter external to the PAL and that the output from the inverter connects to the signal line identified by the signal line reference number. Also, the numbers 0–7 and the letter "P" indicate the particular data lines and parity line in the DATA BUS portion of the SCSI bus.

| Signal Line Reference No. | | PAL Pin No. | | | | | |
|---|---|---|---|---|---|---|---|
| | | U1 | U2 | U5 | U6 | U8 | U10 |
| 232a | | | | | | | 11 |
| 232b | | | | | | | 9 |
| 236a | | | 9 | | | | |
| 236b | | | 2 | | | | |
| 242 | | | | | 8 | 8 | 7 |
| 252a | | | | | | | 19(L) |
| 252b | | | | | | | 12(L) |
| 254a | | | 14 | | | | 4 |
| 254b | | | 15 | | | | 3 |
| 256a | | | | | 12(L) | | |
| 256b | | | | | 16(L) | | |
| 258a | | | | | 13(L) | | |
| 258b | | | | | 17(L) | | |
| 260a | | | 12 | | | | |
| 260b | | | 19 | | | | |
| 262a | n = 0 | 20 | | | | | |
| | n = 1 | 19 | | | | | |
| | n = 2 | 18 | | | | | |
| | n = 3 | 17 | | | | | |
| | n = 4 | | | | 20 | | |
| | n = 5 | | | | 19 | | |
| | n = 6 | | | | 18 | | |
| | n = 7 | | | | 17 | | |
| | n = P | | 17 | | | | |
| 262b | n = 0 | 23,22 | | | | | |
| | n = 1 | 21 | | | | | |
| | n = 2 | 16 | | | | | |
| | n = 3 | 14,15 | | | | | |
| | n = 4 | | | | 22,23 | | |
| | n = 5 | | | | 21 | | |
| | n = 6 | | | | 16 | | |
| | n = 7 | | | | 14,15 | | |
| | n = P | | 18 | | | | |
| 264a | | | | | 14(L) | | |
| 264b | | | | | 18(L) | | |
| 266a | | | | | 15(L) | | |
| 266b | | | | | 19(L) | | |
| 272 | | | | | | 16 | |
| 274 | | 13 | 16 | 13 | 11 | 11 | 8 |
| 276 | | | | | | 15 | 13 |
| 316 | | | 7 | | 2 | 2 | |
| 318 | | | 6 | | | | |
| 332 | n = 0 | 4 | | | | | |
| | n = 1 | 5 | | | | | |
| | n = 2 | 9 | | | | | |
| | n = 3 | 10 | | | | | |

| Signal Line | PAL Pin No. | | | | | |
|---|---|---|---|---|---|---|
| Reference No. | U1 | U2 | U5 | U6 | U8 | U10 |
| n = 4 | | | 4 | | | |
| n = 5 | | | 5 | | | |
| n = 6 | | | 9 | | | |
| n = 7 | | | 10 | | | |
| n = P | | 4 | | | | |
| 334  n = 0 | 2 | | | | | |
| n = 1 | 3 | | | | | |
| n = 2 | 7 | | | | | |
| n = 3 | 8 | | | | | |
| n = 4 | | | 2 | | | |
| n = 5 | | | 3 | | | |
| n = 6 | | | 7 | | | |
| n = 7 | | | 8 | | | |
| n = P | | 3 | | | | |
| 336a | 6 | 8 | 6 | | 19 | |
| 336b | 11 | 5 | 11 | | 18 | |
| 368a | | 11 | | | | |
| 368b | | 1 | | | | |
| 382 | | 13 | | | | |
| 414 | | | | | | 1 |
| 419 | | | | | | 6 |
| 420 | | | | | | 5 |
| 422 | | | | | 13 | |
| 425 | | | | | | 1 |
| 442 | | | | 4 | 4 | 17 |
| 444 | | | | 3 | 3 | 18 |
| 446 | | | | 5 | 5 | 16 |
| 448 | | | | 6 | 6 | 15 |
| 452 | | | | 7 | 7 | 14 |
| 462 | | | | | 14 | |

Control Card PAL ICs U1 and U5—Data Repeaters

```
*D2226*F0*
L0000
1111111111111111111111111111111111111111
1111111111111010111111111111111111111111
1111111011111101111111111111111111111111
1111111111111111111111111111111111111101
0000000000000000000000000000000000000000
0000000000000000000000000000000000000000
0000000000000000000000000000000000000000
0000000000000000000000000000000000000000
1111111111111111111111111111111111111111
1111111111111101011111111111111111111111
1111111111101101111111111111111111111111
1111111111111111111111111111111111111101
0000000000000000000000000000000000000000
0000000000000000000000000000000000000000
0000000000000000000000000000000000000000
0000000000000000000000000000000000000000
1111111111111111111111111111111111111111
1111110111111111111111111111111110111
0111111111111111111111111111111110111
1111111111111111111111111111111111101
0000000000000000000000000000000000000000
0000000000000000000000000000000000000000
0000000000000000000000000000000000000000
0000000000000000000000000000000000000000
1111111111111111111111111111111111111111
1111111110111111111111111111111110111
1111011111111111111111111111111110111
1111111111111111111111111111111111101
0000000000000000000000000000000000000000
0000000000000000000000000000000000000000
0000000000000000000000000000000000000000
1111111111111111111111111111111111111
1111111111111111111111111110111110111
1111111111111111101111111111111110111
1111111111111111111111111111111111101
0000000000000000000000000000000000000000
0000000000000000000000000000000000000000
```

```
0000000000000000000000000000000000000000
0000000000000000000000000000000000000000
1111111111111111111111111111111111111111
1111111111111111111111111111111111010111
1111111111111111111110111111111111110111
1111111111111111111111111111111111111101
0000000000000000000000000000000000000000
0000000000000000000000000000000000000000
0000000000000000000000000000000000000000
0000000000000000000000000000000000000000
1111111111111111111111111111111111111111
1111111111111101111011111111111111111
1111111111111101111111111101111111111
1111111111111111111111111111111111101
0000000000000000000000000000000000000000
0000000000000000000000000000000000000000
0000000000000000000000000000000000000000
0000000000000000000000000000000000000000
1111111111111111111111111111111111111111
1111111111111101111111101111111111111
1111111111111101111111111101111111111
1111111111111111111111111111111111101
0000000000000000000000000000000000000000
0000000000000000000000000000000000000000
0000000000000000000000000000000000000000
0000000000000000000000000000000000000000
*C9B84*
```

Control Card PAL IC U2—Control Signal Repeaters

```
*D2217*F0*
L0000
1111111111111111111111111111111111
1111111111111011111111111111111111
1111111111111111111111111101111111
1111111111111111111111111111111110
1111111111111111111111111110111
0000000000000000000000000000000
0000000000000000000000000000000
0000000000000000000000000000000
1111111111111111111111111111111
1111111011111111111101111111111
1111111111011111111101111111111
1111111111110111111111111111111
0000000000000000000000000000000
0000000000000000000000000000000
0000000000000000000000000000000
0000000000000000000000000000000
1111111111111111111111111111111
1111011111101111111111111111111
1111110111101111111111111111111
1111111111110111111111111111111
0000000000000000000000000000000
0000000000000000000000000000000
0000000000000000000000000000000
0000000000000000000000000000000
0000000000000000000000000000000
0000000000000000000000000000000
0000000000000000000000000000000
0000000000000000000000000000000
0000000000000000000000000000000
0000000000000000000000000000000
1111111111111111111111111111111
1111111111110111111111111111111
1111111111111111101111111111111
1111111111111111110111111111111
0000000000000000000000000000000
0000000000000000000000000000000
0000000000000000000000000000000
0000000000000000000000000000000
1111111111111111111111111111111
1111111111110111111111111111111
1111111111111111111011111111111
1111111111111111101111111111111
0000000000000000000000000000000
```

```
00000000000000000000000000000000
00000000000000000000000000000000
00000000000000000000000000000000
00000000000000000000000000000000
00000000000000000000000000000000
00000000000000000000000000000000
00000000000000000000000000000000
00000000000000000000000000000000
00000000000000000000000000000000
00000000000000000000000000000000
00000000000000000000000000000000
11111111111111111111111111111111
11101111111111111111111111011111
01111111111111111111111111011111
11111111111110111111111111111111
00000000000000000000000000000000
00000000000000000000000000000000
00000000000000000000000000000000
00000000000000000000000000000000
*C60A7*
```

Card PAL IC U6—Buffer Enable Decoders

```
*D2217*F0*
L0000
11111111111111111111111111111111
01111011011101101111011111111110
01111011011101101111111111111110
11111011011101111111011111111110
10111111111011111111111111111110
00000000000000000000000000000000
00000000000000000000000000000000
00000000000000000000000000000000
11111111111111111111111111111111
01111011011101101111011111111110
01111011011101101111111111111110
01111011011101111111111111111110
10111111111011111111111111111110
00000000000000000000000000000000
00000000000000000000000000000000
00000000000000000000000000000000
11111111111111111111111111111111
01111011011101101111011111111110
01111011011101101111111111111110
11111011011101111111011111111110
10111111111011111111111111111110
00000000000000000000000000000000
00000000000000000000000000000000
00000000000000000000000000000000
11111111111111111111111111111111
01111011011101101111011111111110
01111011011101101111111111111110
01111011011101101111111111111110
10111111111011111111111111111110
00000000000000000000000000000000
00000000000000000000000000000000
00000000000000000000000000000000
11111111111111111111111111111111
01111011011101101111011111111110
01111011011101101111111111111110
11111011011101111111011111111110
10111111111011111111111111111110
00000000000000000000000000000000
00000000000000000000000000000000
00000000000000000000000000000000
11111111111111111111111111111111
01111011011101101111011111111110
01111011011101101111111111111110
01111011011101101111111111111110
10111111111011111111111111111110
00000000000000000000000000000000
00000000000000000000000000000000
00000000000000000000000000000000
11111111111111111111111111111111
01111011011101101111011111111110
01111011011101101111111111111110
11111011011101111111011111111110
10111111111011111111111111111110
00000000000000000000000000000000
00000000000000000000000000000000
00000000000000000000000000000000
*C8786*
```

Control Card PAL IC U8—Selection Logic

```
*D2217*F0*
L0000
11111111111111111111111111111111
01111011011110110111011111011110
01111011011101111011011101111110
01111011011110110111011101111110
01111011011101101111011110111110
01111011011110110111111111111110
00000000000000000000000000000000
00000000000000000000000000000000
11111111111111111111111111111111
01111011011110110111011101111110
01111011011101111011011110111110
01111011011110110111011110111110
01111011011101110111011101111110
01111011011101110111111111111110
00000000000000000000000000000000
00000000000000000000000000000000
11111111111111111111111111111111
11101111111111111111111111111111
00000000000000000000000000000000
00000000000000000000000000000000
00000000000000000000000000000000
00000000000000000000000000000000
00000000000000000000000000000000
00000000000000000000000000000000
00000000000000000000000000000000
00000000000000000000000000000000
00000000000000000000000000000000
00000000000000000000000000000000
00000000000000000000000000000000
00000000000000000000000000000000
00000000000000000000000000000000
00000000000000000000000000000000
00000000000000000000000000000000
11111111111111111111111111111111
11011111111110111011101111111111
11111111111111101111111011111101
00000000000000000000000000000000
00000000000000000000000000000000
00000000000000000000000000000000
00000000000000000000000000000000
11111111111111111111111111111111
11111111111111110111011011111101
11111111111111111111011110111111
00000000000000000000000000000000
00000000000000000000000000000000
00000000000000000000000000000000
00000000000000000000000000000000
00000000000000000000000000000000
00000000000000000000000000000000
00000000000000000000000000000000
```

-continued

```
0000000000000000000000000000000
0000000000000000000000000000000
0000000000000000000000000000000
0000000000000000000000000000000
0000000000000000000000000000000
*C44E5*
```

Control Card PAL IC U10—Sequencer

```
*D2217*F0*
L0000
1111111111111111111111111111111
1111101110101111011111111011011
1111111110111101101110110111011
1111111111011101111011101011011
1111110110110111111011101011011
1111101110011111111111110111011
1111111110110111101111101111011
0000000000000000000000000000000
1111111111111111111111111111111
1101111111111111111111111111111
0000000000000000000000000000000
0000000000000000000000000000000
0000000000000000000000000000000
0000000000000000000000000000000
0000000000000000000000000000000
0000000000000000000000000000000
1111111111111111111111111111111
1111111011011111111111111111111
1111111111100111111111111111111
1111111111111111111111111101111
0000000000000000000000000000000
0000000000000000000000000000000
0000000000000000000000000000000
0000000000000000000000000000000
1111111111111111111111111111111
1111011101011111111111110111111
1111011101111101111111110111111
1111111011111101111111110111111
0000000000000000000000000000000
0000000000000000000000000000000
0000000000000000000000000000000
0000000000000000000000000000000
1111111111111111111111111111111
1111100101011111111111110111110
1111010110011111111111110111110
1111111011111111110111110111111
1111111111110111111011111011111
0000000000000000000000000000000
0000000000000000000000000000000
0000000000000000000000000000000
1111111111111111111111111111111
1111101101011111111101111011111
1111101110011111111101111011111
1111111011111111111111010111111
1111111111110111111111010111111
0000000000000000000000000000000
0000000000000000000000000000000
0000000000000000000000000000000
1111111111111111111111111111111
1111100110111011111111111111111
0000000000000000000000000000000
0000000000000000000000000000000
0000000000000000000000000000000
0000000000000000000000000000000
0000000000000000000000000000000
0000000000000000000000000000000
1111111111111111111111111111111
1111101110101110111111110111110
1111111110110111101101101101110
1111111111011101101111010111110
1110111110101111111111111011110
1111011010111111111111110111110
1111111110111011101111101111110
0000000000000000000000000000000
*C7P92*
```

Interface Card PAL 162

Referring now to FIG. 6, the latching-sequencer 410 transmits a PRI OUT signal from the bus switch state sequencer 302 on a PRI OUT L signal line 462 to a plug 464 depicted in FIG. 5. A cable within the bus switch 40 (not depicted in any of the FIGS.) connects to the plug 464 and extends the PRI OUT L signal line 462 from the control card 44 to the inter-interface connector 188 of one of the sharing bus interface cards 48. At the inter-interface connector 188, the PRI OUT L signal line 462 connects to the PRI IN L signal line 202 depicted in FIG. 4. Thus, the signal line 462 transfers the PRI OUT signal from the bus switch state sequencer 302 on the control card 44 to the PAL 162 of one of the sharing bus interface cards 48.

Figure 7:
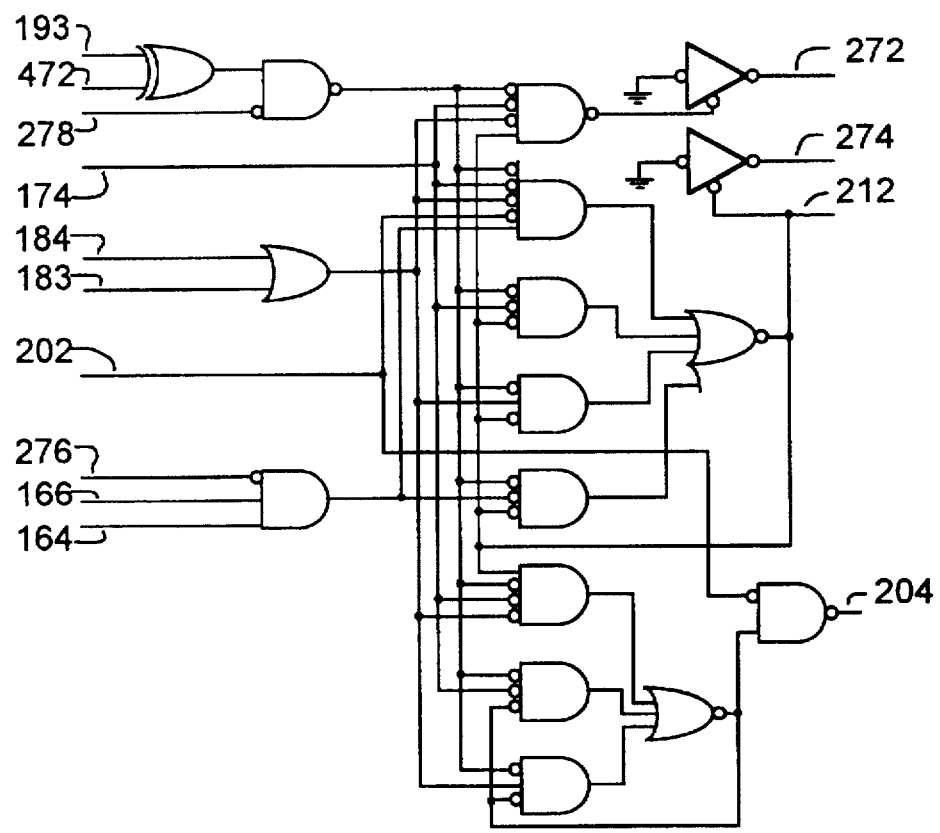
FIG. 7 is a logic diagram depicting the interface card's PAL.

FIG. 7 is a logic diagram depicting the PAL 162 included in the interface card 48. As with the logic diagrams of FIGS. 5 and 6, the logic diagram of FIG. 7 illustrates the construction of the PAL 162 from a pedagogical viewpoint rather than conforming to the actual implementation of the preferred embodiment. To increase comprehension, the logic circuitry depicted in FIG. 7 may omit or simplify certain details of the actual implementation of the PAL 162, e.g. details related to logic minimization and to the elimination of logic "hazards," even logic hazards arising from transitions between phases of the SCSI bus protocol. Moreover, the logic diagram of FIG. 7 may also omit details related to circuit loading. However, while FIG. 7 may not precisely depict the structure of the preferred embodiment, the detailed structure of the portion of the interface card 48 residing in the PAL 162 is expressly set forth in the description below. Accordingly, in the following discussion of FIG. 7 all logic devices that are not expressly referred to by a reference number reside in the PAL 162. The PAL 162 operates in conjunction with signals from the bus switch state sequencer 302 and from the BSY and SEL signals on the SCSI bus to which it connects as described below.

The signals exchanged between the PALs 162 on the sharing interface cards 48 and the bus switch state sequencer 302 over the BUS IDLE L signal line 276, the CHANGE REQUEST L signal lines 272 and 272b, the BUS CONNECTED L signal lines 274 and 274b, and the daisy-chained PRI OUT L signal lines 204 and 462 and the PRI IN L signal lines 202 mediate selection and deselection of a particular sharing bus interface card 48 for exchanging signals with the control card 44. Both the BUS CONNECTED L signal line 274b and the CHANGE REQUEST L signal line 272b are wire-OR signal and are asserted low. Thus, assertion of the signal on the CHANGE REQUEST L signal line 272 of a sharing interface card 48 informs the bus switch state sequencer 302 that one or more sharing interface cards 48 is enabled to be selected for exchanging signals with the control card 44. Similarly, assertion of the signal on the BUS CONNECTED L signal line 274 of a sharing interface card 48 informs the bus switch state sequencer 302 that one of the sharing interface cards 48 is presently selected for exchanging signals with the control card 44. The signals from the PALs 162 on the sharing interface cards 48 via the signal lines 272 and 274 provide the bus switch state sequencer 302 with the information necessary for it to drive the signal on its PRI OUT L signal line 462 that grants a requesting sharing bus interface card 48 permission to become selected for exchanging signals with the control card 44. The daisy-chaining of the PRI OUT L signal lines 462 and 204 and PRI IN L signal lines 202 through the sharing bus interface cards 48 allows these cards 48 to determine among themselves which of the sharing bus interface cards 48 will be selected for exchanging signals with the control card 44.

To prevent interface cards 48 from becoming enabled for exchanging signals between the control card 44 and the data bus 52–58 to which they respectively connect (or becoming disabled from exchanging such signals) in the middle of a transaction on the shared data bus 58, the bus switch state sequencer 302 asserts the BUS IDLE L signal on the signal line 276 only when it detects the BUS FREE phase of the SCSI protocol. The PALs 162 in all the interface cards 48 receive the BUS IDLE L signal from the bus switch state sequencer 302 together with signals on the BSY BUF L signal line 164 and SEL-BUF L signal line 166 of the bus 52–58 to which they connect. Consequently, the PAL 162 in each interface card 48 receives signals indicating when the BUS FREE phase of the SCSI protocol exists on the shared data bus 58 and on the data bus 52–58 to which it connects. The PAL 162 uses these signals to enable its interface card 48 for exchanging signals with the control card 44 (or disable the card 48 from exchanging such signals), i.e. changes the state of the latch which drives the BOARD SELECTED L signal line 212, only when it detects that the BUS FREE phase of the SCSI bus protocol exists simultaneously both on the data bus 52–58 to which it connects and on the shared data bus 58. Thus, the interface cards 48 become selected for exchanging signals between the control card 44 and the data bus 52–58 to which they respectively connect or become disabled from exchanging such signals only when its PAL 162 detects the BUS FREE phase of the SCSI bus protocol on all of the relevant buses 52–58.

To use the bus switch 40 to gain access to the devices connected to the shared data bus 58, an operator of one of the computers 62 closes the contacts of the toggle switch 84. After expiration of a 2.2 millisecond switch debounce time interval established by the monostable multivibrator 176, the PAL 162 responds to the closure of the toggle switch 84 by asserting the signal that it transmits on the CHANGE REQUEST L signal line 272b.

Presentation of the asserted CHANGE REQUEST L signal on the signal line 272b by any of the PALs 162 informs the bus switch state sequencer 302 that one of the sharing interface cards 48 is enabled for selection to exchange signals with the control card 44. After the bus switch state sequencer 302 receives the assertion of the CHANGE REQUEST L signal on line 272b, when the BUS CONNECTED L signal line 274b becomes negated (i.e. none of the sharing interface cards 48 are exchanging signals with the control card 44) and the BUS IDLE L signal is asserted (i.e. the shared data bus 58 is in the BUS FREE phase of the SCSI protocol), the bus switch state sequencer 302 then asserts the signal it transmits on the SELECT L signal line 422 and latches it. Assertion of the signal on the SELECT L signal line 422 triggers the monostable multivibrator 424 to begin a four millisecond interval during which the signal on the PRI OUT L signal line 462 remains negated. (Also during this interval all devices connected to the shared data bus 58 are reset if the jumper 426 is installed on the control card 302.) At the end of the four millisecond interval, the bus switch state sequencer 302 then asserts and latches the signal on the PRI OUT L signal line 462.

When the PAL 162 that asserted the signal on the CHANGE REQUESTED L signal line 272b receives the assertion of the signal on its PRI IN L signal line 202 and both of the relevant buses 52–58 are in their BUS FREE phase as described above, the PAL 162 then asserts and latches the signal that it transmits to the bus switch state sequencer 302 on the BUS CONNECTED L signal line 274b and negates the signal on the CHANGE REQUEST L signal line 272b. The PAL 162 of the sharing interface card 48 maintains its assertion of the signal on the BUS CONNECTED L signal line 274b as long as the toggle switch 84 remains closed or the composite bus 52–58, 54–58 or 56–58 with which it is associated is not in the BUS FREE phase of the SCSI protocol. The bus switch state sequencer 302 responds to assertion of the BUS CONNECTED L signal line 274b by the PAL 162 of the sharing interface card 48 by unlatching the asserted signal on the SELECT L signal line 422 and negating that signal.

Contention among the sharing bus interface cards 48 for access to the control card 44 is resolved using a daisy-chain of the PRI OUT L signal lines 204 and PRI IN L signal lines 202 through the sharing data bus interface cards 48. Each of the PALs 162 in the sharing interface cards 48 includes a second latch that inhibits retransmission of the PRI IN signal to the PRI OUT L signal line 204 while either the sharing interface card 48 asserts the signal on the CHANGE REQUESTED L signal line 272 or is enabled for exchanging SCSI bus signals with the control card 44. Otherwise, this latch in the PAL 162 of the sharing interface card 48 allows the signal received by the sharing interface card 48 on the PRI IN L signal line 202 to be transferred to PRI OUT L signal line 204. Thus, while the toggle switch 84 connected to an interface card 48 remains open, the PRI OUT signal received by that interface card 48 is merely passed on to the next interface card 48 in the daisy-chain. When the toggle switch 84 is closed, and the signal on the BOARD SELECT L signal line 212 is negated, and the signal on the PRI IN L signal line 202 is negated, then the latch for inhibiting the PRI OUT signal in the PAL 162 of the sharing bus interface card 48 is set. Setting the latch forces the signal on the PRI OUT L signal line 204 of that interface card 48 remain negated. Negation of the signal on the PRI OUT L signal line 204 by an interface card 48 prevents any interface card 48 further along the daisy-chain of PRI OUT L and PRI IN L signal lines 204 and 202 from asserting the signal on the BUS CONNECTED L signal line 274b. If an interface card 48 cannot assert the signal on the BUS CONNECTED L signal line 274b, it cannot become selected for exchanging signals with the control card 44.

Note that if the PAL 162 of a single-ended interface card 48 receives a signal from the buffer 192 indicating that a differential type SCSI device is connected to the bus 52, 54, 56 or 58 to which it connects, it immediately electronically isolates the circuits on the interface card 48 from the bus 52, 54, 56 or 58 by negating the signal on the BOARD ENABLE L signal line 212. Since negation of the BOARD ENABLE L signal line 212 prevents the LEDs on the housing for the bus switch 40 and at the shared bus-request box 76 from being illuminated, the inability to illuminate those LEDs is a positive indication that a differential type SCSI device is connected to the bus 52, 54, 56 or 58 to which the single-ended interface card 48 connects.

The PAL 162 is an MMI 16L8 assigned JEDEC type no. 2217 and is identified as U17 in the table below. That table lists the reference numbers of signal lines described in the preceding text and specifies the particular pin numbers of the various PALs to which that signal line connects. To adapt the PAL 162 for use in a single-ended interface card 48, the voltage Vcc is applied to a BOARD DIF L signal line 472 depicted in FIG. 7.

| Signal Line Reference No. | IC Pin No. U17 |
|---|---|
| 164 | 6 |
| 166 | 7 |
| 174 | 1 |
| 183 | 9 |
| 184 | 8 |
| 193 | 2 |
| 202 | 11 |
| 204 | 12 |
| 212 | 16 |
| 272 | 15 |
| 274 | 14 |
| 276 | 4 |
| 278 | 5 |
| 472 | 3 |

Interface Card PAL IC U17—Bus Selection Logic

```
*D2217*F0*
L0000
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
1 1 1 1 1 1 1 1 1 1 1 1 1 1 1 1 1 1 1 1 1 1 1 1 1 1 1 1 1 1 1 1
1 0 1 1 0 1 1 1 1 1 1 1 1 0 1 1 1 1 1 1 1 1 1 1 1 1 1 1 1 1 1 1
0 1 1 1 1 0 1 1 1 1 1 1 1 0 1 1 1 1 1 1 1 1 1 1 1 1 1 1 1 1 1 1
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
1 1 1 1 1 1 1 1 1 1 1 1 1 1 1 1 1 1 1 1 1 1 1 1 1 1 1 1 1 1 1 1
1 1 1 1 1 1 1 0 1 1 1 1 1 1 0 1 1 1 1 1 1 1 1 1 1 1 0 1 0 1 0 0 1
1 1 1 1 1 1 1 0 1 1 1 0 1 1 1 1 1 1 1 1 1 1 1 1 1 1 0 1 0 1 0 1 1
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
1 1 1 1 1 1 1 1 1 1 1 1 1 1 1 1 1 1 1 1 1 1 1 1 1 1 1 1 1 1 1 1
1 1 1 1 1 1 1 0 1 0 1 1 1 1 1 1 0 1 1 1 0 1 1 1 1 1 0 1 0 1 0 1 0
1 1 1 1 1 1 1 0 1 1 1 1 1 1 1 0 1 1 1 1 1 1 1 1 1 1 1 1 0 1 1 1 1
1 1 1 1 1 1 1 0 1 1 1 1 1 1 1 0 1 1 1 1 1 1 1 1 1 1 1 1 0 1 1 1 1
1 1 1 1 1 1 1 0 1 1 1 1 1 1 1 0 1 1 1 1 1 1 1 1 1 1 0 1 1 1 1 1 1
1 1 1 1 1 1 1 0 0 1 1 1 1 1 1 0 1 1 1 1 1 1 1 1 1 1 1 1 1 1 1 1 1
1 1 1 1 1 1 1 0 1 1 1 1 1 1 1 0 1 0 1 1 1 1 1 1 1 1 1 1 1 1 1 1 1
1 1 1 1 1 1 1 0 1 1 1 1 1 1 1 0 1 1 1 1 0 1 1 1 1 1 1 1 1 1 1 1 1
1 1 1 1 1 1 1 0 1 1 1 1 1 1 1 0 1 1 1 1 1 1 1 1 1 1 0 1 0 1 0 1 1
1 1 1 1 1 1 1 1 1 1 1 1 1 1 1 1 1 1 1 1 1 1 1 1 1 1 1 1 1 1 1 1
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
1 1 1 1 1 1 1 1 1 1 1 1 1 1 1 0 1 1 1 1 1 1 1 1 1 1 1 1 1 1 1 1
1 1 1 1 1 1 1 1 1 1 1 1 1 1 1 1 1 1 1 1 1 1 1 1 1 1 1 1 1 1 1 1
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
1 1 1 1 1 1 1 1 1 1 1 1 1 1 1 1 1 1 1 1 1 1 1 1 1 1 1 1 1 1 1 1
1 1 1 0 1 1 1 1 1 1 1 1 1 1 1 1 1 1 1 1 1 1 1 1 1 1 1 1 1 1 1 1
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
1 1 1 1 1 1 1 1 1 1 1 1 1 1 1 1 1 1 1 1 1 1 1 1 1 1 1 1 1 1 1 1
1 1 1 1 1 1 1 1 1 1 1 0 1 1 1 1 1 1 1 1 1 1 1 1 1 1 1 1 1 1 1 1
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
*C4BEA*
```

For the interface card 48 that connects to shared data bus 58, as stated previously both the PRI IN L signal line 202 and the SWITCH L signal line 182 connect to circuit ground. Thus, in accordance with the preceding description of the operation of the interface cards 48 connected to the sharing data buses 52, 54 and 56, the interface card connected to the shared bus 58 is always provided with a priority signal that allows it to respond to the grounding of its SWITCH L signal line 182 and is thereby always enabled to exchange signals between the control card 44 and the shared data bus 58.

Differential SCSI Bus Interface Card

In place of one or more of the single-ended interface cards 48 depicted in FIG. 4 that is adapted to exchange signals with a single-ended SCSI bus 52, 54, 56 or 58, a differential interface card could be joined to the control card 44 at any of the interface connectors 46a or 46b depicted in FIGS. 2 or 3. Under such circumstances, the bus switch 40 or 40' would then be adapted to exchange signals between a differential SCSI bus and a single-ended SCSI bus, or between pairs of differential SCSI buses. Thus, by appropriately choosing the particular type of interface card 48, either single-ended or differential, for mating with the interface connectors 46a or 46b of the control card 44, the bus switch 40 may be easily and quickly adapted to operate with any combination of single-ended and differential SCSI data buses 52, 54, 56 and 58.

There are only a few differences between the single-ended interface card 48 depicted in FIG. 4 and a differential interface card. First, each pair of receiving buffers 136 and transmitting buffers 138 in each of the switched transceiver circuits 122–132 are replaced by a single DS3695 integrated circuit, and the connections to the SCSI bus connector 60 is changed from the single-ended SCSI specification to the differential SCSI specification. This single DS3695 integrated circuit, which replaces each pair of buffers 136 and 138, receives or transmits a differential SCSI bus signal in response to the same control signals depicted in FIG. 4 and described in the preceding text. In addition, if the differential interface card is located at either end of the differential SCSI bus, then it must also include differential termination resistor networks instead of the termination resistors 154 and 156 depicted in FIG. 4.

With regard to the PAL 162, a differential interface card uses the same PAL 162 as that described above for the single ended interface card 48. However, for the differential interface card, pin 3 of the PAL 162 is connected to ground rather than to Vcc. While the PAL 162 still receives a BUS OK L signal via the BUS OK L signal line 193, that signal now indicates that a single-ended SCSI bus device is connected to the differential interface card rather than the converse. To adapt the buffer 192 to sense connection to a single-ended SCSI device, the resistor 196 that connects between the input of the buffer and circuit ground is replaced by a series connected 1N4148 diode and resistor with the resistor being connected to the input of the buffer 192 and the anode of the diode being connected to Vcc. In addition, the DIFFSENS line 194, that for the single-ended SCSI bus connects to pin 25 of the single ended SCSI bus connector 60, now connects to pin 21 of the differential SCSI bus connector.

Industrial Applicability

Although the present invention has been described in terms of the presently preferred embodiment, it is to be understood that such disclosure is purely illustrative and is not to be interpreted as limiting. While the preceding description of the bus switch 40 has involved exchanging signals between only three sharing data buses 52, 54 and 56 and the shared data bus 58, in principle the invention is useful with a plurality of buses that is unlimited. Moreover, the general features disclosed herein, including the response to signals on the SCSI bus's BSY signal line and the arbitration-latches included in the bidirectional repeaters, appears applicable to other distributed arbitration digital data buses in which devices connect to the bus in parallel and none of the signal lines in the bus daisy-chains serially through a sequence of devices that transmit and/or receive data over the bus.

Since the bus switch 40 may be easily adapted for exchanging signals with either a single-ended SCSI bus or a differential SCSI bus, the bus switch 40 is useful simply as a repeater for exchanging signals between one single-ended SCSI bus, e.g. shared data bus 58, and one differential SCSI bus, e.g. one of the sharing data buses 52, 54 or 56. Alternatively, because the length of the single-ended SCSI bus is limited by signal strength and noise coupling between the bus' several signal conductors, the bus switch 40 is also useful merely as a repeater for exchanging signals between two single-ended SCSI buses having a total length that is greater than the 6 meter limitation of the SCSI bus specification.

The usefulness of the bus switch 40 as a repeater for exchanging signals between SCSI buses is enhanced by its latching of both BSY signal lines of the buses 52, 54, 56 or 58 included in the composite bus 52–54, 52–56 or 52–58 during ARBITRATION and RESELECTION phases. Latching of both BSY signal lines 102 of both of the buses 52, 54, 56 or 58 during these phases prevents wire-OR glitches on the BSY control signal line 102 in one of the buses 52, 54, 56 or 58, that are a normal event in the SCSI bus' ARBITRATION and RESELECTION phases, from propagating to the BSY control signal line 102 in the other bus 52, 54, 56 or 58. It appears that this aspect of the bus switch 40 will allow its use as a repeater for coupling multiple SCSI buses into a single composite bus having a total length greater than 25 meters. Failing to latch the BSY signals on both buses during the ARBITRATION and RESELECTION phases will limit the total effective length of the composite bus to 25 meters including logic delays through a repeater or bus switch 40.

When used solely as a repeater between distributed arbitration buses whose length limitations arise from protocol considerations rather than signal quality considerations, e.g. differential SCSI buses, the bus switch 40 need include only the switched transceiver circuits 122 and 124 for the BSY control signal lines 102 and for the SEL control signal lines 104 together with that portion of the circuitry on the control card 44 which controls the transmission of the BSY and SEL signals by the bus switch 40, e.g. the circuitry which responds to the BSY, SEL and I/O SCSI bus signals. Such a minimal repeater omits all of the switched transceivers 126, 128, 130 and 132 and their associated control logic on the control card 44.

Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

We claim:

1. A repeater for exchanging information between digital computing devices respectively connected in parallel to a shared distributed arbitration digital data bus or to a sharing distributed arbitration digital data bus, each distributed arbitration digital data bus respectively including signal lines upon which signals occur, said repeater interconnecting the shared and the sharing distributed arbitration digital data buses into a single, composite distributed arbitration digital data bus, said repeater comprising:

shared bus interface means, connected to the shared distributed arbitration digital data bus, for receiving signals from and transmitting signals to a device connected to the shared distributed arbitration digital data bus;

sharing bus interface means, connected to the sharing distributed arbitration digital data bus, for receiving signals from and transmitting signals to a device connected to the sharing distributed arbitration digital data bus; and control circuit means, simultaneously connected both to said shared bus interface means and to said sharing bus interface means, said control circuit means responding to a plurality of signals on the shared and sharing distributed arbitration digital data buses for controlling both of said bus interface means during an exchange of information between devices connected to the composite distributed arbitration digital data bus, whereby a combination of said bus interface means, said sharing bus interface means, and said control circuit means exchanges signals in both directions between the shared distributed arbitration digital data bus and the sharing distributed arbitration digital data bus as though the repeater were a continuous cable.

2. The repeater of claim 1 wherein information is exchanged between devices connected to the composite distributed arbitration digital data bus in accordance with a bus protocol having a plurality of phases, said control circuit means also responding to an occurrence of a sequence of phases of the bus protocol.

3. The repeater of claim 2 wherein the shared distributed arbitration digital data bus employs a first signaling convention for communicating signals thereon and the sharing distributed arbitration digital data bus employs a second signaling convention for communicating signals thereon, the first and second signaling conventions by which signals are communicated respectively on the shared and sharing distributed arbitration digital data buses being incompatible with each other.

4. The repeater of claim 2 wherein said shared bus interface means exchanges signals with a device in accordance with a first signaling convention, said shared bus interface means indicating if a device employing a different signaling convention, incompatible with the first signaling convention of said shared bus interface means, is connected to the shared distributed arbitration digital data bus.

5. The repeater of claim 2 wherein said sharing bus interface means exchanges signals with a device in accordance with a first signaling convention, said sharing bus interface means indicating if a device employing a different signaling convention, incompatible with the first signaling convention of said sharing bus interface means, is connected to the sharing distributed arbitration digital data bus.

6. A bus interface card in a repeater for exchanging information between digital computing devices respectively connected in parallel to a shared distributed arbitration digital data bus or to a sharing distributed arbitration digital data bus, each distributed arbitration digital data bus respectively including signal lines upon which signals occur, said repeater interconnecting the shared and the sharing distributed arbitration digital data buses into a single, composite distributed arbitration digital data bus and exchanging signals in both directions between the shared distributed arbitration digital data bus and the sharing distributed arbitration digital data bus as though the repeater were a continuous cable, said repeater including control circuit means for connection respectively to bus interface cards for the shared and for the sharing distributed arbitration digital data buses, said control circuit means responding to a plurality of signals on the shared and sharing distributed arbitration digital data buses for controlling both bus interface cards during an exchange of information between devices connected to the composite distributed arbitration digital data bus, said bus interface card comprising:

means for connecting to the distributed arbitration digital data bus;

means for connecting to said control circuit means; and means for exchanging signals between a device connected to the distributed arbitration digital data bus, and said control circuit means.

7. The bus interface card of claim 6 wherein information is exchanged between devices connected to the composite distributed arbitration digital data bus in accordance with a bus protocol having a plurality of phases, said bus interface card being adapted for control by said control circuit means responsive to an occurrence of a sequence of phases of the bus protocol.

8. The bus interface card of claim 7 wherein the shared distributed arbitration digital data bus employs a first signaling convention for communicating signals thereon and the sharing distributed arbitration digital data bus employs a second signaling convention for communicating signals thereon, the first and second signaling conventions by which signals are communicated respectively on the shared and sharing distributed arbitration digital data buses being incompatible with each other.

9. The bus interface card of claim 7 wherein said bus interface card exchanges signals with a device in accordance with a first signaling convention, said bus interface card indicating if a device employing a different signaling convention, incompatible with the first signaling convention of said bus interface card, is connected via the distributed arbitration digital data bus to said bus interface card.

10. The bus interface card of claim 7 further comprising selection switch means for enabling said bus interface card for exchanging information between said control circuit means and a device connected to a distributed arbitration digital data bus to which said interface card connects.

11. A repeater for exchanging information between digital computing devices respectively connected in parallel to a shared distributed arbitration digital data bus or to a sharing distributed arbitration digital data bus, each distributed arbitration digital data bus respectively including signal lines upon which signals occur, said repeater interconnecting the shared and the sharing distributed arbitration digital data buses into a single, composite distributed arbitration digital data bus, said repeater comprising:

shared bus interface means, connectable to the shared distributed arbitration digital data bus, for receiving signals from and transmitting signals to a device connected to the shared distributed arbitration digital data bus;

sharing bus interface means, connectable to the sharing distributed arbitration digital data bus, for receiving signals from and transmitting signals to a device connected to the sharing distributed arbitration digital data bus; and control circuit means, simultaneously connected both to said shared bus interface means and to said sharing bus interface means, said control circuit means responding to a plurality of signals on the shared and sharing distributed arbitration digital data buses for controlling both of said bus interface means during an exchange of information between devices connected to the composite distributed arbitration digital data bus, whereby a combination of said combined bus interface means, said sharing bus interface means, and said control circuit means exchanges signals in both directions between the shared distributed arbitration digital data bus and the sharing distributed arbitration digital data bus as though the repeater were a continuous cable.

12. The repeater of claim 11 wherein information is exchanged between devices connected to the composite distributed arbitration digital data bus in accordance with a bus protocol having a plurality of phases, said control circuit means also responding to an occurrence of a sequence of phases of the bus protocol.

13. The repeater of claim 12 wherein the shared distributed arbitration digital data bus employs a first signaling convention for communicating signals thereon and the sharing distributed arbitration digital data bus employs a second signaling convention for communicating signals thereon, the first and second signaling conventions by which signals are communicated respectively on the shared and sharing distributed arbitration digital data buses being incompatible with each other.

14. The repeater of claim 12 wherein said shared bus interface means exchanges signals with a device in accordance with a first signaling convention, said shared bus interface means indicating if a device employing a different signaling convention, incompatible with the first signaling convention of said shared bus interface means, is connected to the shared distributed arbitration digital data bus.

* * * * *